US007975043B2

(12) United States Patent
Douglas et al.

(10) Patent No.: US 7,975,043 B2
(45) Date of Patent: Jul. 5, 2011

(54) METHOD AND APPARATUS FOR MONITORING A NETWORK

(75) Inventors: Christopher Paul Douglas, Loveland, CO (US); Chia-Chu Dorland, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2812 days.

(21) Appl. No.: 10/372,440

(22) Filed: Feb. 25, 2003

(65) Prior Publication Data

US 2004/0172466 A1 Sep. 2, 2004

(51) Int. Cl.
*G06F 15/173* (2006.01)

(52) U.S. Cl. ........................................................ 709/224

(58) Field of Classification Search ........................ None
See application file for complete search history.

(56) References Cited

U.S. PATENT DOCUMENTS

| | | | | |
|---|---|---|---|---|
| 5,049,873 | A | 9/1991 | Robins et al. | |
| 5,185,860 | A | 2/1993 | Wu | |
| 5,261,044 | A | 11/1993 | Dev et al. | |
| 5,276,789 | A | 1/1994 | Besaw et al. | |
| 5,295,244 | A | 3/1994 | Dev et al. | |
| 5,483,631 | A | 1/1996 | Nagai et al. | |
| 5,504,863 | A | 4/1996 | Yoshida | |
| 5,572,640 | A | 11/1996 | Schettler | |
| 5,684,967 | A | 11/1997 | McKenna et al. | |
| 5,768,552 | A | 6/1998 | Jacoby | |
| 5,768,614 | A | 6/1998 | Takagi et al. | |
| 5,805,819 | A | 9/1998 | Chin et al. | |
| 5,831,618 | A | 11/1998 | Fuji et al. | |
| 6,029,195 | A * | 2/2000 | Herz | 725/116 |
| 6,061,505 | A | 5/2000 | Pitchaikani et al. | |
| 6,101,498 | A | 8/2000 | Scaer et al. | |
| 6,128,623 | A | 10/2000 | Mattis et al. | |
| 6,263,371 | B1 | 7/2001 | Geagan, III et al. | |
| 6,272,150 | B1 | 8/2001 | Hrastar et al. | |
| 6,289,380 | B1 | 9/2001 | Battat et al. | |
| 6,333,739 | B1 | 12/2001 | Koyama et al. | |
| 6,377,987 | B1 | 4/2002 | Kracht | |
| 6,405,248 | B1 | 6/2002 | Wood | |
| 6,411,997 | B1 | 6/2002 | Dawes et al. | |
| 6,421,726 | B1 | 7/2002 | Kenner et al. | |
| 6,426,947 | B1 * | 7/2002 | Banker et al. | 370/254 |
| 6,442,651 | B2 | 8/2002 | Crow et al. | |
| 6,449,647 | B1 | 9/2002 | Colby et al. | |
| 6,529,950 | B1 * | 3/2003 | Lumelsky et al. | 709/218 |
| 6,820,133 | B1 * | 11/2004 | Grove et al. | 709/238 |
| 6,865,570 | B2 * | 3/2005 | Silverbrook et al. | 707/3 |
| 6,973,450 | B1 * | 12/2005 | Silverbrook et al. | 707/3 |
| 2001/0056416 | A1 * | 12/2001 | Garcia-Luna-Aceves | 707/2 |

(Continued)

OTHER PUBLICATIONS

Internet Protocol: Connectionless Datagram Delivery (IP) Chapter 7, pp. 74-75.
Inktomi, Broadcast Manager Suite, pp. 5-6.

*Primary Examiner* — Vivek Srivastava
*Assistant Examiner* — William J Goodchild

(57) ABSTRACT

In accordance with exemplary embodiments, a method for monitoring a content delivery network includes obtaining data from devices within the network, organizing the data into hierarchically accessible tiers, and displaying at least part of the data at one of the hierarchal tiers, wherein the hierarchical tiers include a) a site tier including a map comprising ones of the devices that are potential content sources in the network, b) a service tier including a map comprising content-based relationships between the devices, and c) an operations tier including a map comprising characteristics of the devices and characteristics of relationships between the devices and content in the network.

30 Claims, 15 Drawing Sheets

U.S. PATENT DOCUMENTS

2002/0004846 A1* 1/2002 Garcia-Luna-Aceves et al. .......... 709/245
2005/0108224 A1* 5/2005 Silverbrook et al. .......... 707/3
2005/0193114 A1* 9/2005 Colby et al. .......... 709/226

* cited by examiner

210

| Status | Type | Device Name | DNS Name | Customers | Portal | View |
|---|---|---|---|---|---|---|
| ○ | Caches | Cisco CE590 | Ovcdnce1.cnd.hp.com | Customer List | http://serviceportal.hp.com | Where is it? |
| ⊗ | Caches | Cisco CE590 | Ovcdnce2.cnd.hp.com | Customer List | http://serviceportal.hp.com | Where is it? |
| ○ | Routers | Cisco CR4450 | Ovcdncr.cnd.hp.com | | | Where is it? |
| ○ | Switches | Cisco CSS11080 | Ovcdncss.cnd.hp.com | | | Where is it? |
| ○ | CDM | Cisco CDM4670 | Ovcdncdm.cnd.hp.com | Customer List | http://ovcdncdm.hp.com | Where is it? |
| | | | | | | |

| Status | Type | Application Name | Hostname Name | Reports | Network topology locator |
|---|---|---|---|---|---|
| ○ | Streaming media | QuickTime | Ovcchia.cnd.hp.com | View Reports | Where is it? |
| ○ | Streaming media | RealSystem Server 8 | Ovccd.cnd.hp.com | View Reports | Where is it? |
| ⊗ | Distribution Manager | Cisco CDM4670 | Ovccd.cnd.hp.com | View Reports | Where is it? |
| ○ | Web Server | Apache | Ovcdnsvr.cnd.hp.com | View Reports | Where is it? |
| ○ | Storage Server | Oracle | Ovcdnsvr.cnd.hp.com | View Reports | Where is it? |
| | | | | | |

| Status | Type | Device List | Real Time Stats | Reports | Site |
|---|---|---|---|---|---|
| ○ | WCCP Group | Device List | RT Stats | View Reports | Houston |
| ⊗ | WCCP Group | Device List | RT Stats | View Reports | Denver |
| ○ | ESI | Device List | RT Stats | View Reports | Denver |
| ○ | WCCP Group | Device List | RT Stats | View Reports | New York |
| ○ | ESI | Device List | RT Stats | View Reports | New York |
| | | | | | |

FIG. 10

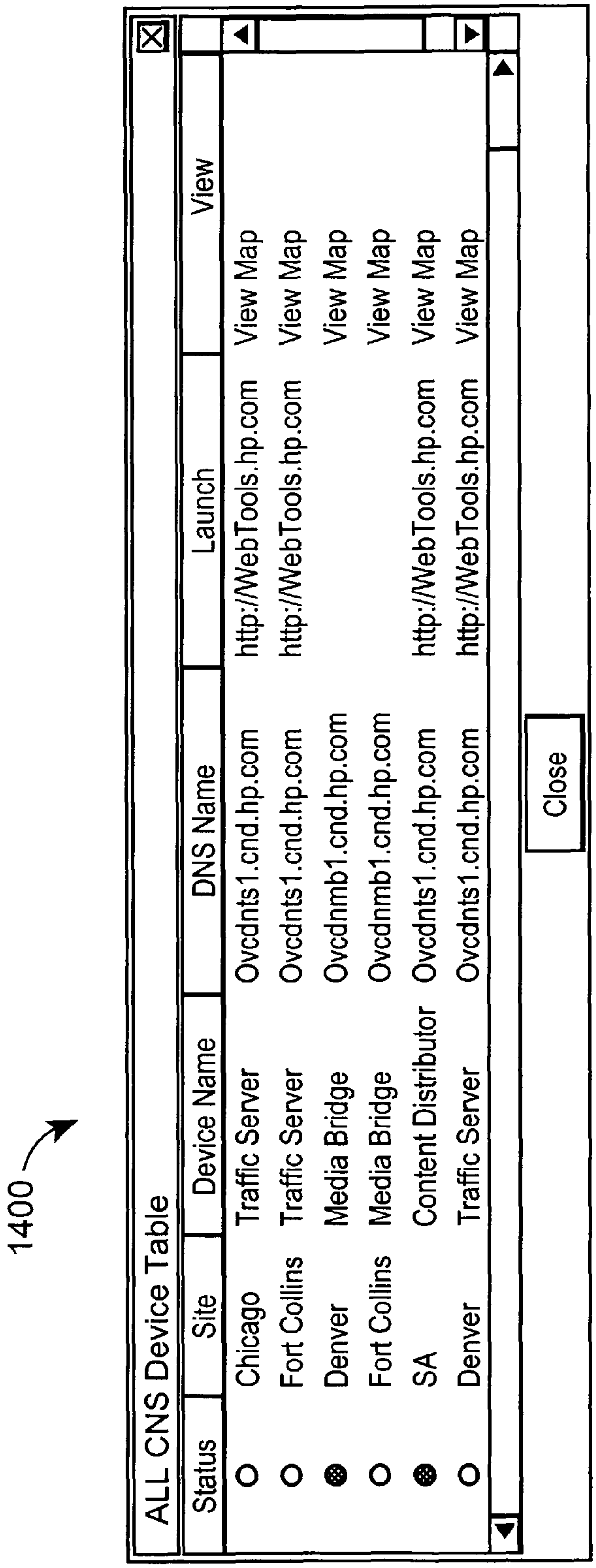

FIG. 14

ALL CNS Device Table (1400)

| Status | Site | Device Name | DNS Name | Launch | View |
|---|---|---|---|---|---|
| ○ | Chicago | Traffic Server | Ovcdnts1.cnd.hp.com | http://WebTools.hp.com | View Map |
| ○ | Fort Collins | Traffic Server | Ovcdnts1.cnd.hp.com | http://WebTools.hp.com | View Map |
| ● | Denver | Media Bridge | Ovcdnmb1.cnd.hp.com | | View Map |
| ○ | Fort Collins | Media Bridge | Ovcdnmb1.cnd.hp.com | | View Map |
| ● | SA | Content Distributor | Ovcdnts1.cnd.hp.com | http://WebTools.hp.com | View Map |
| ○ | Denver | Traffic Server | Ovcdnts1.cnd.hp.com | http://WebTools.hp.com | View Map |

Close

| Status | Site | Device Name | DNS Name | Launch | View |
|---|---|---|---|---|---|
| ⊟ Site: Chicago (1 item) | | | | | |
| ⊟ Site: Denver (2 items) | | | | | |
| ● | Denver | Media Bridge | Ovcdnmb1.cnd.hp.c... | | View Map |
| ○ | Denver | Traffic Server | Ovcdnts1.cnd.hp.com | http://WebTools.hp.com | View Map |
| ⊞ Site: Fort Collins (2 items) | | | | | |
| ⊞ Site: LA (1 item) | | | | | |
| ⊞ Site: SA (1 item) | | | | | |

Table titled "ALL CNS Sites" (1500), with Close button.

METHOD AND APPARATUS FOR MONITORING A NETWORK

RELATED APPLICATIONS

Copending U.S. application Ser. No. 10/372,314 and Ser. No. 10/372,450, respectively entitled "Method and System for Monitoring Relationships between Content Devices in a Content Delivery Network" and "Method and System for Monitoring Streaming Media Flow" and designated respectively, are hereby incorporated by reference. These copending applications list inventors Chris DOUGLAS, et al. and were filed in the U.S. Patent and Trademark Office on the same date as the present application.

BACKGROUND

Inktomi Corporation, Cisco Systems Inc., and CacheFlow (now Blue Coat Systems, Inc.) have manufactured various solutions for use in Content Delivery Networks (CDNs), including cache devices and Content Distribution Managers (CDMs), with accompanying software. Some of these solutions provide a management tool for homogeneous caches. U.S. Pat. No. 6,442,651 and U.S. Pat. No. 6,263,371 assigned to CacheFlow, U.S. Pat. No. 6,128,623 assigned to Inktomi Corporation, U.S. Pat. No. 6,449,647 assigned to Cisco Systems Inc., and U.S. Pat. No. 6,421,726 assigned to Akamai Technologies Inc. describe various aspects of data networks and are hereby incorporated by reference.

These solutions do not manage heterogeneous equipment, such as equipment from different manufacturers, all running in the same environment, and don't present a complete, logical management model to an administrator.

SUMMARY

An exemplary method of monitoring a content delivery network, includes obtaining data from devices within the network, organizing the data into hierarchically accessible tiers, and displaying at least part of the data at one of the hierarchically accessible tiers, wherein the hierarchically accessible tiers include a) a site tier including a map of those devices that are potential content sources in the network, b) a service tier including a map of content-based relationships among the content sources, and c) an operations tier including a map of characteristics of the content sources and characteristics of relationships between the content sources and content in the network. An exemplary machine readable medium includes software for causing a computing device to perform the exemplary method.

An exemplary system for monitoring a content delivery network includes a computer configured to obtain data from devices within the network, and organize the data into hierarchically accessible tiers, and a display for displaying at least part of the data at one of the hierarchically accessible tiers, wherein the hierarchically accessible tiers include a) a site tier map of those devices that are potential content sources in the network, b) a service tier map of content-based relationships among the content sources, and c) an operations tier map of characteristics of the content sources and characteristics of relationships between the content sources and content in the network, wherein the computer is configured to provide the organized data to the display.

An exemplary system for monitoring a content delivery network includes means for obtaining data from devices within the network, means for organizing the data into hierarchically accessible tiers, and means for displaying at least part of the data at one of the hierarchically accessible tiers, wherein the hierarchically accessible tiers include a site tier including a map of those devices that are potential content sources in the network, a service tier including a map of content-based relationships among the content sources, and an operations tier including a map of characteristics of the content sources and characteristics of relationships between the content sources and content in the network.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements and:

FIG. 8 shows a device table 210 in the operations tier shown in FIG. 2, in accordance with an exemplary embodiment.

FIG. 9 shows an application(s) table 212 in the operations tier shown in FIG. 2, in accordance with an exemplary embodiment.

FIG. 10 shows a protocol status table 214 in the operations tier shown in FIG. 2, in accordance with an exemplary embodiment.

FIG. 14 shows an exemplary device list 1400 in accordance with an exemplary embodiment.

DETAILED DESCRIPTION OF THE EXEMPLARY EMBODIMENTS

Figure 1:
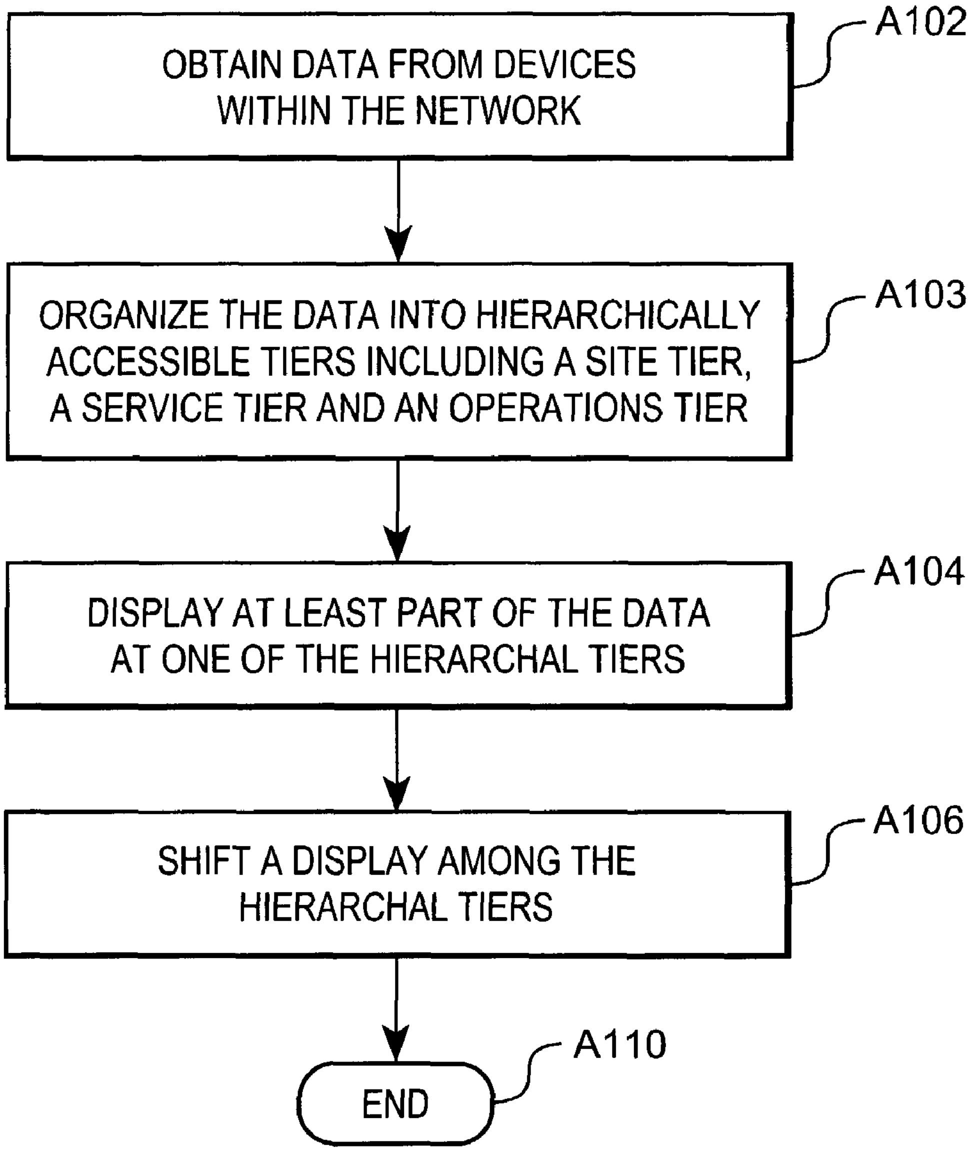
FIG. 1 shows a flow diagram in accordance with an exemplary embodiment.

FIG. 1 illustrates an exemplary method for monitoring a content delivery network, wherein at a first step A102, data are obtained from potential content sources in a network, for example content devices in a Content Delivery Network (CDN). In a step A103, the data are organized into hierarchal or hierarchically accessible tiers including a site tier, a service tier, and an operations tier. In a step A104, at least part of the data are displayed at one of the hierarchical tiers, as for example in a map. As used herein, a "map" is any visual presentation of information in textual and/or graphical form. In step A106, the display is shifted among the hierarchical tiers. In a step A110, the process ends.

Figure 2:
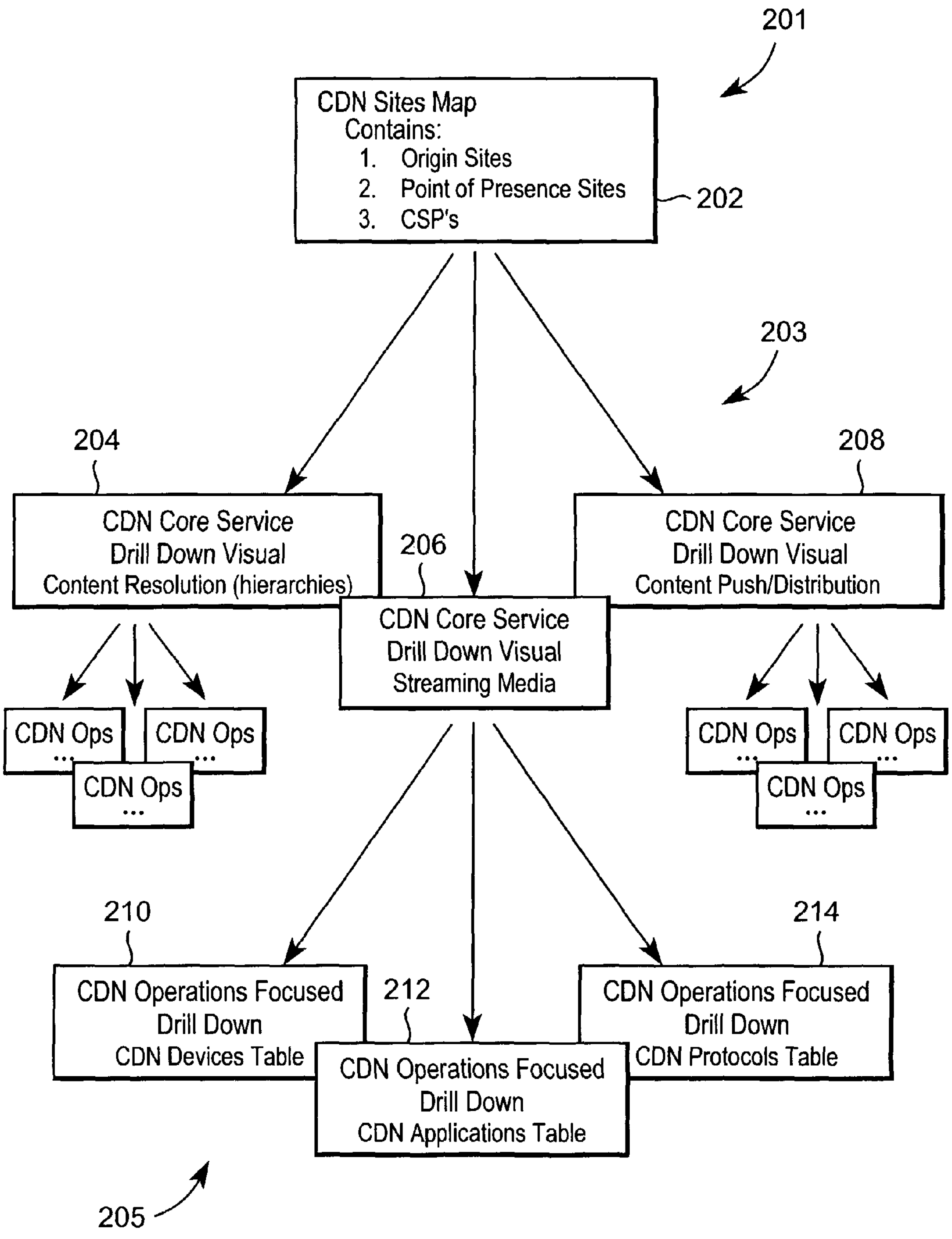
FIG. 2 shows a schematic overview of an exemplary embodiment consistent with the process shown in FIG. 1.

FIG. 2 illustrates a schematic overview of an exemplary hierarchical organization of network information consistent with the process shown in FIG. 1, where three tiers are provided: a first hierarchical tier represented as a site tier 201, a second hierarchical tier represented as a service tier 203, and a third hierarchical tier represented as an operations tier 205. The site tier 201 includes sites information 202. The sites information 202 can include, for example, devices within the network that are potential content sources within the network, and can indicate locations of the devices within the network. The locations can be, for example, exact geographic locations (as shown for example in FIG. 3), relative geographic locations, or logical locations within the network. The devices within the network shown in a map of the sites information 202 can be, for example, origin sites, point-of-presence sites, and communication service providers.

As referenced herein, a CDN (Content Delivery Network) can be a system of distributed content on a large intranet or the public Internet in which copies of content are replicated and cached throughout the network. When content is replicated via the system throughout the country, or throughout the world, users can have quicker access to it than if it resides on one Web site. CDNs can be provided, for example, by content delivery organizations such as Akamai, by large Internet Service Providers (ISPs) or by large enterprises. A CDN can be implemented as an overlay to a traditional internet protocol (IP) network, and functions or operates based on layers 4-7 of the IP protocol stack. Layers 1-7 are defined in accordance with the International Organization for Standardization (ISO) model. A discussion of computer network protocols and layers of the ISO model is discussed, for example, in "Interconnections, Second Edition," by Radia Perlman (Addison-Wesley, 2000), the disclosure of which is incorporated herein by reference in its entirety.

As referenced herein, a "content device" is a networking device that plays a role in a CDN, by a) storing or manipulating content, or b) processing requests for content, in the CDN. As referenced in this document, "content distribution path" represents a logical path between a source and a destination, as defined by a logical relationship existing at layers 4-7 of the overlay network of the CDN. Caches store content, and process or respond to requests for content. In the context of a CDN, a content device called a "router" processes requests for content but does not deliver or receive the content. Generally, devices that handle IP packets in a traditional fashion are not "content devices". Thus, layer 1-3 devices, for example those beneath the CDN overlay network, are not "content devices".

Figure 3:
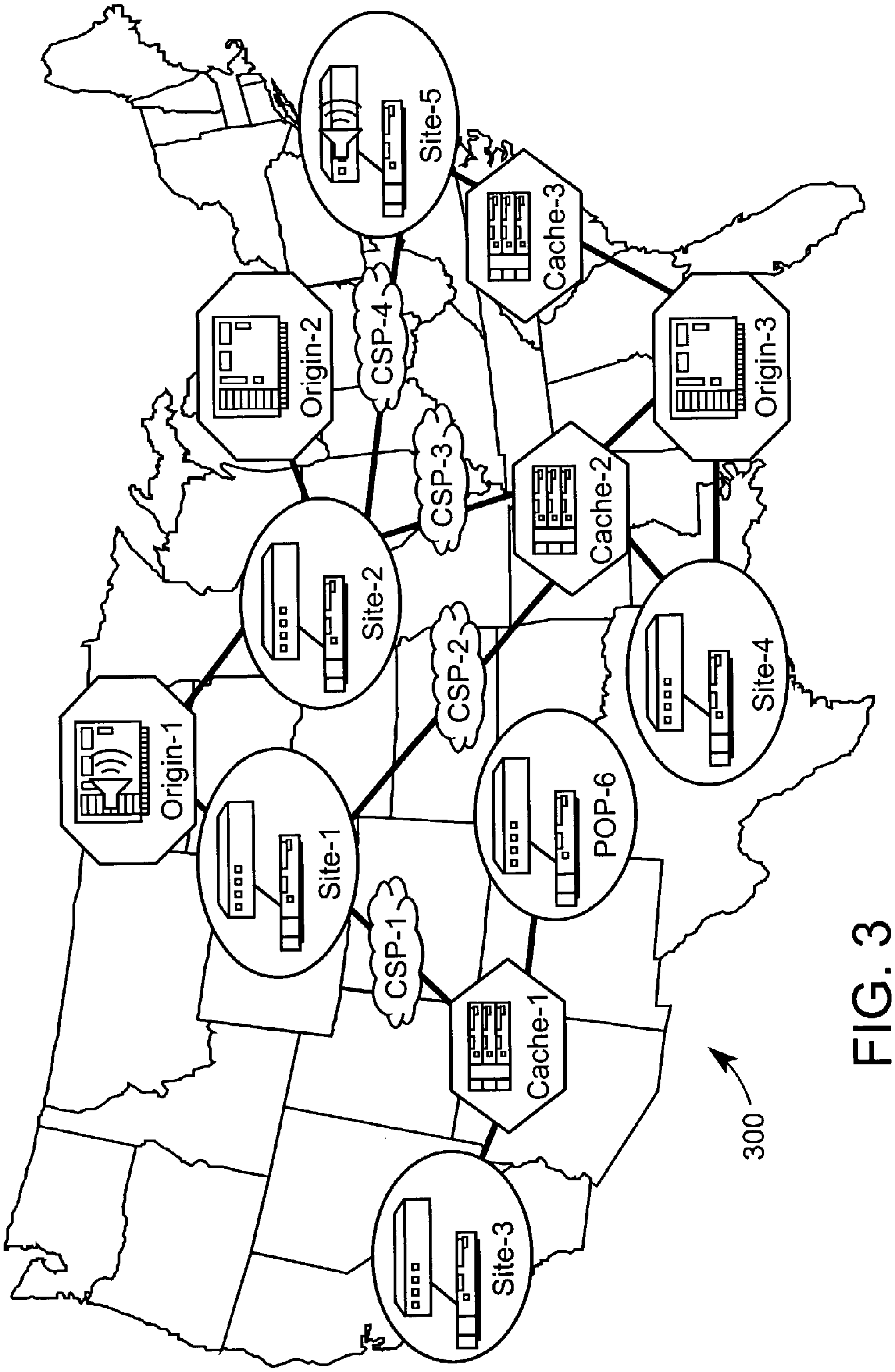
FIG. 3 shows a map in the site tier shown in FIG. 2, including geographic locations within the contiguous United States of potential content sources within an exemplary network, in accordance with an exemplary embodiment.

FIG. 3 shows a site map 300 of geographic locations within the contiguous United States of potential content sources within an exemplary Sites Map of an exemplary network, for example a CDN. In this example, the CDN includes a Site 3, a POP-6 and a CSP 1 linked to a Cache 1, a Site-1 linked to an Origin 1, the CSP 1 and a CSP 2, a Site-2 linked to the Origin-1, a CSP 3, a CSP 4 and an Origin-2, a Cache-2 linked to a Site-4, the CSP 2, the CSP 3 and an Origin-3, and a Site-5 linked to the CSP 4, and a Cache-3. The Origin-3 is also linked to the Site-4 and the Cache-3.

The site tier can also show or display site level statistics and reports, other broad-based displays or views, and customer focused displays or views.

Referring to FIG. 2, a service tier 203 appears below the site tier 201. The service tier 203 includes a map containing content-based relationships between devices in the network. For example, in accordance with exemplary embodiments the service tier 203 includes information 204 regarding content resolution within the network, information 206 regarding streaming media within the network, and information regarding content distribution within the network.

Figure 4:
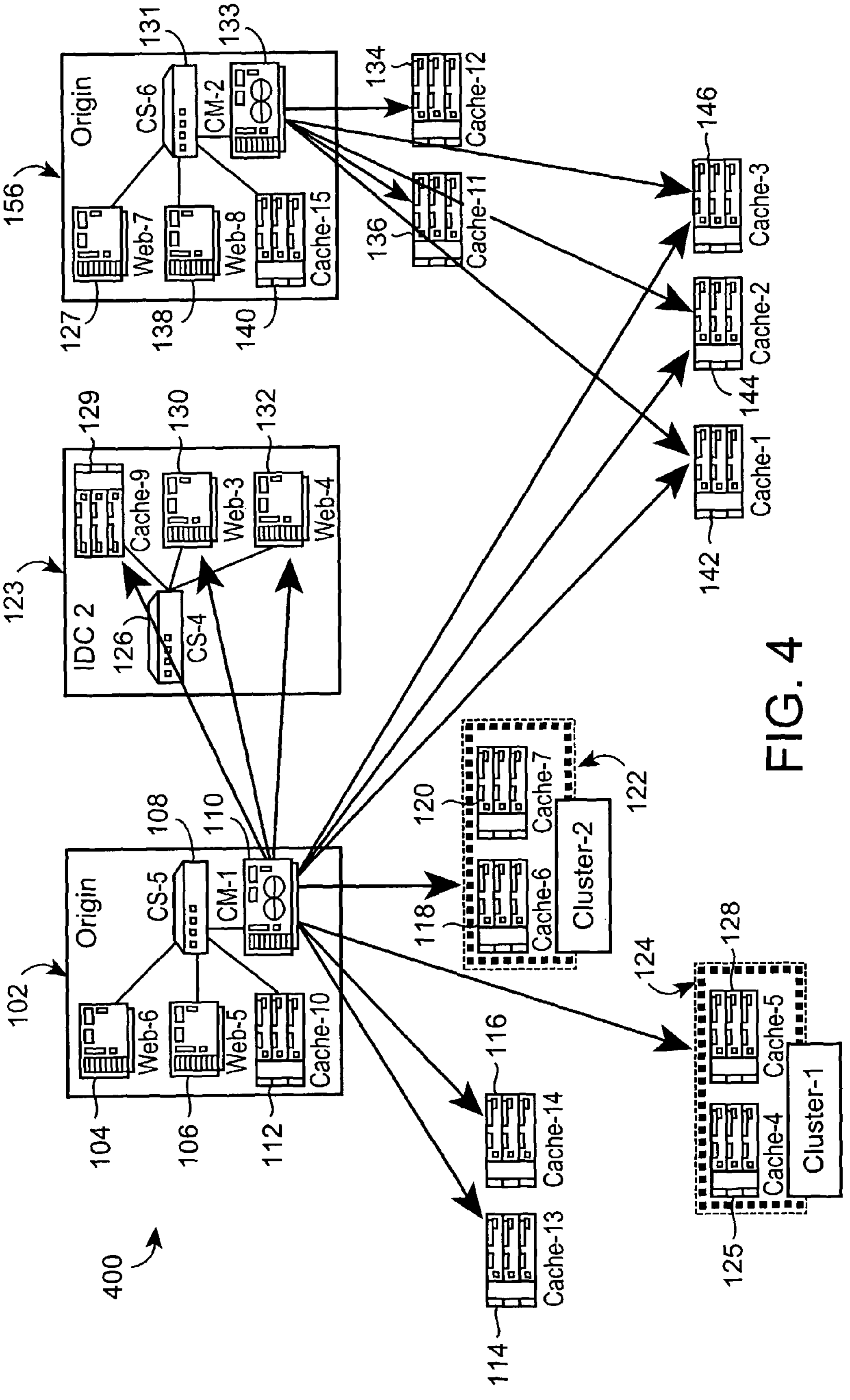
FIG. 4 shows an exemplary map or display 400 in the service tier shown in FIG. 2, including content distribution within a network, in accordance with an exemplary embodiment.
Figure 5:
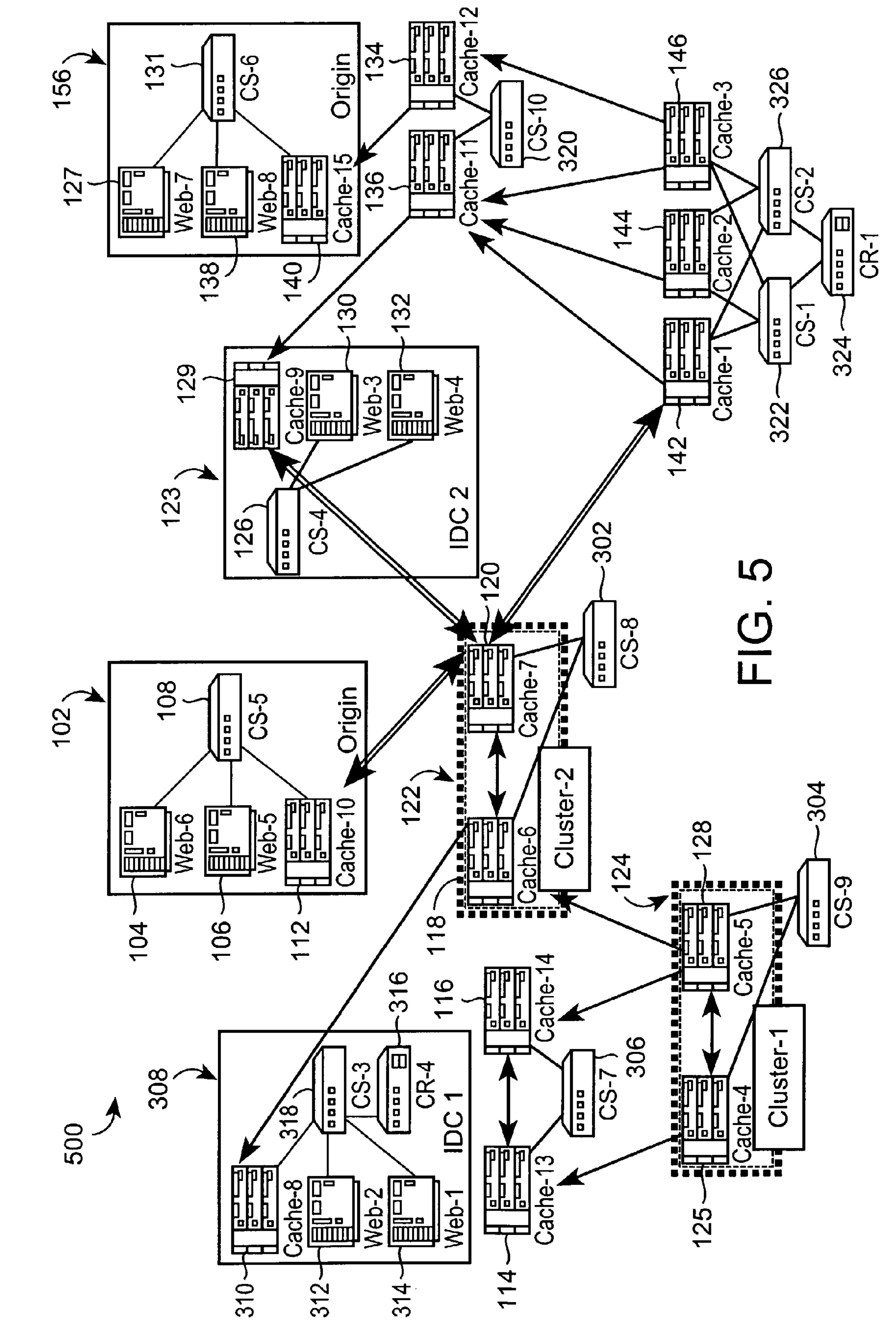
FIG. 5 shows an exemplary map or display 500 in the service tier shown in FIG. 2, including content resolution within a network, in accordance with an exemplary embodiment.
Figure 6:
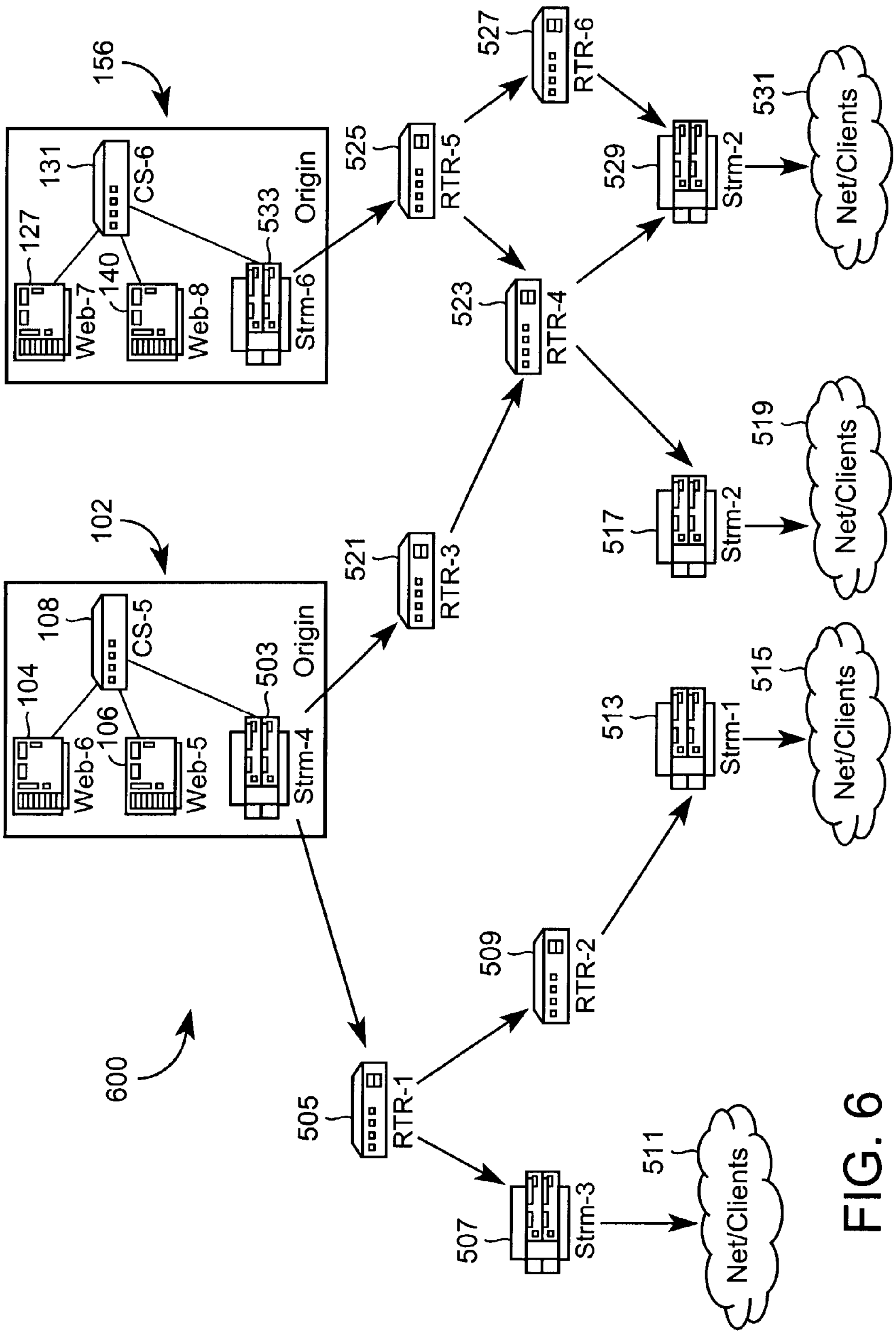
FIG. 6 illustrates a map 600 in the service tier of shown in FIG. 2, including streaming media communication paths in a network, in accordance with an exemplary embodiment.
Figure 7:
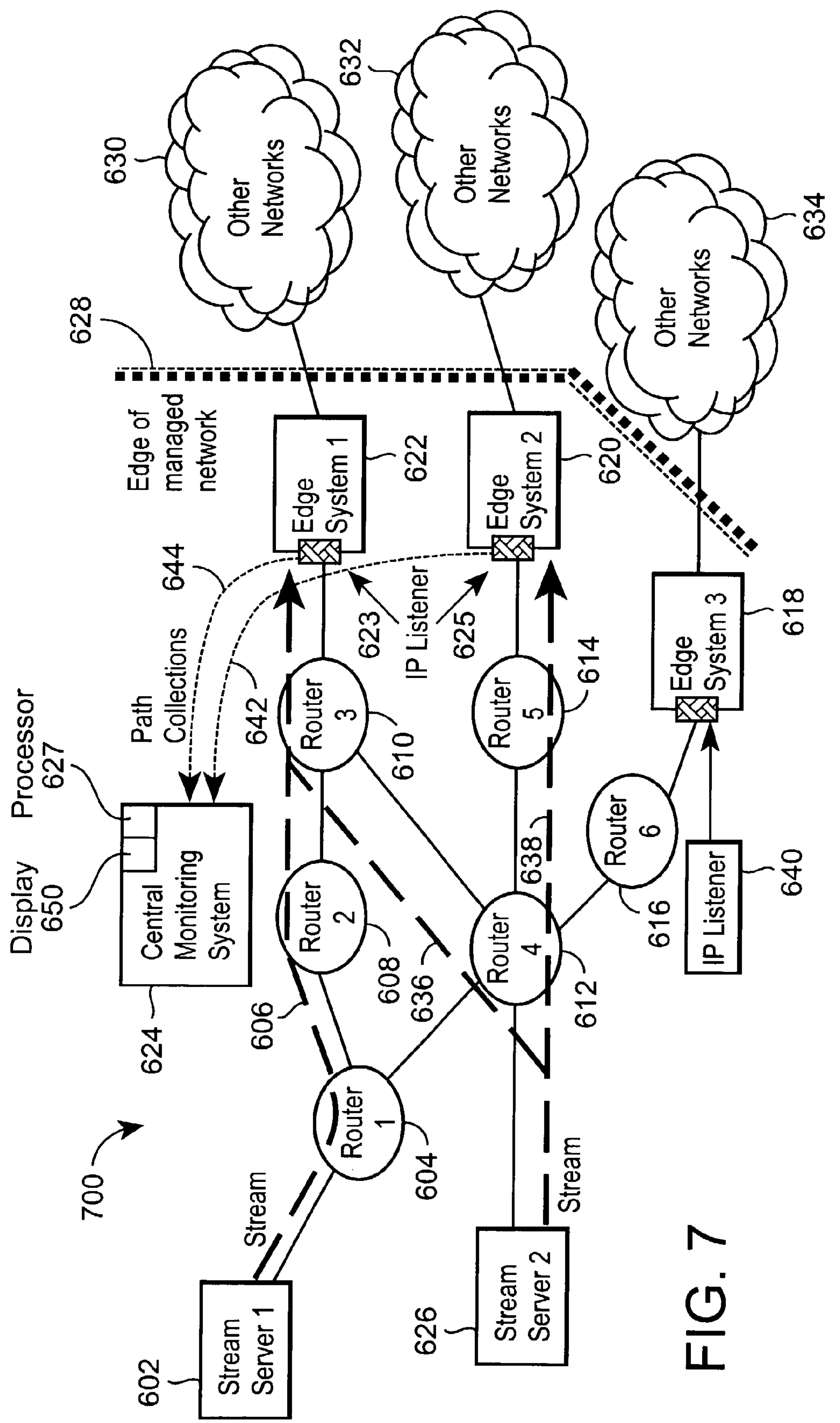
FIG. 7 shows a map 700 including a structure and technique for detecting streaming media paths in a network in accordance with an exemplary embodiment.

Content distribution information 208 can be mapped or shown as in FIG. 4, content resolution information 204 can be mapped or shown as in FIG. 5, and streaming media information 206, such as streaming media paths or activities within the network can be shown as in FIGS. 6-7.

The map or display 400 of content distribution information 208 shown in FIG. 4 illustrates cache deployment in a CDN, or in other words, distribution of electronic content or data to caches in the CDN. As shown in FIG. 4, the CDN includes a management computer such as the content manager 110 (CM-1). The CDN can include a plurality of management computers, as demonstrated for example by the content manager 133 (CM-2). As shown in FIG. 4, electronic data is distributed from an origin 102, and specifically from the content manager 110. Content switches in the CDN, such as the content switch 108, process requests for content but do not receive or transmit the content. A content switch can act as a load-balancer. For example, the content switch 108 (CS-5) in FIG. 4 can receive a content request from a user and can relay the request to the cache 112 (Also labeled as "Cache-10"), the web server 106, or the web server 104 for fulfillment.

As shown in FIG. 4, the content manager 110 provides data directly to caches 114, 116, 142, 144, and 146. The content manager 110 also provides data to clusters 124, 122 or caches. The cluster 124 contains caches 125, 128 and the cluster 122 contains caches 118, 120. The Internet Data Center (IDC) 123 references a physical site with physical equipment, and includes a cache 129, web servers 130, 132 and a content switch 126.

There can be multiple origins of data within the network. For example, FIG. 4 also shows a second origin 156, including a second content manager 133 that also distributes data to caches in the network, and a content switch 131 (CS-6). The second origin 156 also includes web servers 127, 138 and a cache 140. The content manager 133 provides the data directly to the caches 134, 136, 142, 144, and 146. A cache can receive data from different origins or content managers. For example, the caches 142, 144, 146 receive data from both of the content managers 110, 133.

FIG. 5 shows a map or display 500 of content resolution information 206 generated in accordance with exemplary embodiments. The map illustrates content resolution among the caches in the network, or in other words, a hierarchy of links used to resolve the manner by which caches in the network share and distribute electronic content or data among themselves. In an exemplary embodiment, the hierarchy is a logical hierarchy wherein three different kinds of links are available: 1) parent-child, 2) sibling-sibling, and 3) multicast.

In the parent-child type link, when a child cache receives a request for content that it does not have, the child cache contacts a cache that has a parent relationship to the child cache and requests the content from the parent cache. This relationship is represented in FIG. 5 as a solid line segment with a single arrowhead at one end, with the arrow pointing from a child to a parent. See, for example, the link connecting the cache 114 (also labeled as "Cache 13") and the cache 125

(also labeled as "Cache 4"), which indicates that the cache 114 is a parent to the cache 125, and the cache 125 is a child to the cache 114. In an exemplary embodiment, a child cache can have multiple parent caches, as shown for example in FIG. 5 where the child cache 128 has two parent caches 116, 118.

In the sibling-sibling type link, either cache can request content from the other cache. This link is represented in FIG. 5 as a solid line segment with two arrowheads, one at each end of the line segment. For example, FIG. 5 shows that the caches 114, 116 are sibling caches so that the cache 114 can request content from the cache 116, and vice versa.

The multicast link is represented in FIG. 5 as a line segment formed by two parallel solid lines spaced apart and bounded with an arrowhead at each end. For example, the cache 120 has multicast links to each of the caches 112, 129, and 142. A cache can "multicast" by simultaneously requesting content from all caches that are connected to it with a multicast link. In an exemplary embodiment, each direct multicast link is a two-way link (as indicated by an arrowhead on each end of line segment), so that either cache on each end of the link can send a content request to the other cache. For example, the cache 120 can simultaneously request content from the caches 112, 129, and 142. However, the cache 142 has only one multicast link, to the cache 120, and thus when it multicasts a content request, the request would go only to the cache 120. In accordance with an exemplary embodiment, a multicast link can be unidirectional instead of bidirectional.

If a first cache receives a request from a second cache for content that the first cache does not have, the first cache can request the content from other caches, and convey the content back to the second cache after obtaining the content. For example, the cache 142 can request content from the cache 120. If the cache 120 does not have the content, then it can multicast a request for the content to the caches 112, 129 (and 142). After receiving the content, the cache 120 can then transfer the content to the cache 142.

In the event that a first cache requests content from another cache or from other caches and does not receive the requested content, the first cache can contact an origin or content manager directly to request the content. In the event the first cache is unable to obtain the content and the first cache is attempting to obtain the content at the request of another entity (for example, a user or another cache), the first cache can generate a message indicating the content has not been obtained, and send the message to the entity (for example, a user or another cache) that requested the content from the first cache.

FIG. 6 illustrates an exemplary map of streaming media information 206, which includes communication paths represented in FIG. 6 using arrows with relatively thicker lines. Any other desired or appropriate designation can be used. In FIG. 6, a first communication path extends from a stream server 503 in the origin 102, and to a router 505. From the router 505 are two communication paths, one extending to a stream server 507 and onward from the stream server 507 to a network 511 with clients, and the other extending sequentially to a router 509, a stream server 513 and a network 515 with clients. The networks 511, 515 can be networks external to the encompassing the origin 102.

The media stream flowing along the path between the router 505 and the stream server 507 can be the same as the media stream flowing along the path between the router 505 and the router 509, so that the media stream flowing from the stream server 503 to the router 505 is split when it departs the router 505. Alternatively, media streams flowing to the stream servers 507, 513 can also be different, for example so that two different media streams both flow from the stream server 503 to the router 505, but take different communication paths after departing the router 505. This principle or possibility applies in the same way to other communication paths shown in FIGS. 6-7, wherever paths fork.

FIG. 6 also shows a second communication path beginning from the stream server 503 and flowing sequentially through a router 521 to a router 523. From the router 523 two communication paths are shown, one extending through a stream server 517 to a network 519 with clients, and the other extending or flowing through a stream server 529 to a network 531 with clients.

In addition, FIG. 6 shows a communication path beginning from a stream server 533 in the origin 156. This communication path flows from the stream server 533 to a router 525, and from the router 525 two communication paths are shown. A first communication path extends from the router 525 sequentially through a router 527 and the stream server 529 to the network 531. The second communication path flows or extends from the router 525 to the router 523. From the router 523 two communication paths are shown, A first communication path flowing from the router 523 through the stream server 529 to the network 531, and the second communication path flowing or extending from the router 523 through the stream server 517 to the network 519.

The streaming media paths shown in FIG. 6 can be discovered using an exemplary technique shown in FIG. 7. This technique uses an IP (Internet Protocol) Record Route option at the Layer 3 of a network complying with the ISO model, or a similar mechanism available via other communication protocols in use within the network, in combination with a series of listeners and some management station processing. Specifically, the Record Route option is invoked to cause IP packets in a media stream to record the IP addresses of routers and gateways they pass through or transit. Then, listeners located near an outer boundary of the network collect the recorded IP addresses from IP packets leaving the network. A packet's list of recorded IP addresses indicates the path it took through the network, and in this way the streaming media pathways through the network are discerned.

As an alternative, or in addition to invoking the Record Route option where appropriate, the listeners can also look for packets that originated at one or more particular sources within the network and that contain streaming media. If these packets do not have the Record Route option set, then path information would include the origins of the packets and the locations of the listeners that detected them, in essence the endpoints of the paths the packets took through the network. These features and principles are described in greater detail in U.S. application Ser. No. 10/372,450.

The Record Route can be enabled by the sending application, for example by the streaming servers 503, 533 in the origins 102, 156 shown in FIG. 3, or by the streaming servers 602, 626 shown in FIG. 7. Once this option is enabled, each data packet will record the IP address of each router or gateway it passes through, in its packet header.

Thus, packets flowing along the FIG. 7 streaming media path 606 extending from the stream server 602 through the router 604, the router 608 and the router 610, will record the addresses of these routers. Packets flowing along the streaming media path 636 extending from the stream server 626 through the router 612, and the router 610 will record the addresses of these routers 612, 610. Packets flowing along the streaming media path 638 extending from the stream server 626 through the router 612 and the router 614 will record the addresses of these routers 612, 614. A router 616 connected between the router 612 and an edge system 618 having an IP listener 640 are also shown in FIG. 7, as well as other networks 630, 632 and 634 connected respectively to edge systems 622, 620 and 618 through an outer boundary 628 of the network containing the communication paths 606, 636, 638.

In accordance with exemplary embodiments, an "IP Listener" 623, 625, 640, which can be a software agent located in an edge system or edge device such as the edge systems 622, 620, 618 within the network and near an outer boundary 628 of the network as shown in FIG. 7, observes packets flowing through it and detects packets having both a) the Record Route option set, and b) a Streaming Protocol designated as the IP ULP (Upper Layer Protocol). From each such detected packet, the listener 623, 625, 640 collects the recorded list of IP addresses, and then adds a) the source IP address to the front of the list, and b) its own IP address to the end of the list, to form a list indicating a stream or communication path beginning at the origin and ending at the listener 623, 625. The listener 623, 625, 640 can gather data from packets it detects and then at the end of a periodic time interval or when it has gathered a specific amount of data, the listener 623, 625, 640 can send the collected data to a central monitoring system. For example, FIG. 7 shows collection paths 644, 642 from the listeners 623, 625 respectively to the central monitoring system 624, via which the listeners forward the collected data. Since a communication path or stream is not present through the edge system 618, a collection path from the listener 640 is not shown.

The central monitoring system 624 (or any other designated device and/or software) processes the collected data and then maps, or provides refined information with which to map, the streaming media paths in the network in a map display, as for example in FIG. 6. The system 624 can include a processor 627 and a display 650. The system 624 together with the IP Listeners 623, 625, 640 can for example perform the method shown in FIG. 1, for example consistent with FIG. 2.

The central monitoring system can be the system or agent that forms and presents the map displays, or can be a system or agent that cooperates with the system or agent responsible for the map display. Each listener can be a dedicated unit, or can be implemented in software on an existing system hardware resource. In addition, the listener can assign an identifier or label to each unique path, track the frequency or the number of times each unique path is used during the periodic time interval, and provide this information along with the collected data to the central monitoring system. Thus at the end of the periodic time interval, each listener can provide data to the central monitoring system including paths as defined by strings or lists of addresses such as IP addresses, path identifiers, and path counts. The listeners can be organized to report to the central monitoring system at the same time, or to report at staggered times. The listeners can also be organized into groups, where each group reports to the central monitoring system at a different time.

The service level tier can provide or show statistics and reports, other broad-based displays or views, and/or customer-focused displays or views.

Referring to FIG. 2, an operations tier 205 appears below the service tier 203. The operations tier 205 includes a map containing a) characteristics of the devices in the network, and b) characteristics of relationships between the devices and content in the network. For example, the operations tier can include a devices table 210, an applications table 212, and a protocols table 214.

FIG. 8 shows an example of the FIG. 2 devices table 210 in the operations tier 205. The device table indicates devices in the network, for example content devices, in accordance with exemplary embodiments. In the table shown in FIG. 8, each row corresponds to a device, and the columns include cells indicating different features or aspects of the devices. For example, for devices in the network, the table can indicate or provide a link (for example, a network link) to: a status of the device; a type of the device; a name of the device; a DNS (Domain Name Server) name of the device; a list of customers (for example, customers connected to the device); a portal associated with the device; and a location of the device within the network. For example, a first data row in the table of FIG. 8 provides information for a device named "Cisco CE590" including an indication that the device is a cache-type device, a DNS name of "Ovcdnce1.cnd.hp.com", a link "Customer List" to a list of customers associated with the device, a portal named or identified as "http://serviceportal.hp.com", and a link "Where is it?" that when activated will display a location of the device in the network. In accordance with exemplary embodiments the displayed location can be a geographical location (actual or relative) of the device within the network, and/or a logical location within the network. Basic status information can be indicated by a color of the icon or "bullet" in the status cell, with different colors indicating different status. In exemplary embodiments, the device table can include an entry or row of entries for each content device in the network. In exemplary embodiments, links in the table can be activated by double-clicking on them. As those skilled in the art will appreciate, the links can be activated in a variety of ways.

In accordance with exemplary embodiments, the device table of FIG. 8 can be used to "drill-down" for additional information. For example, in accordance with exemplary embodiments, right-clicking on the status icon in a status cell of the table can cause more details regarding device status and associated events to be displayed, for example a current load, a hit/miss ratio, configuration information, and so forth. Clicking on a cell entry in the DNS Name column can cause statistical information regarding the device and/or its performance to be displayed. Clicking on a cell entry in the Customers column can cause a list of customers associated with the corresponding device to be shown, and the list can provide links for further drill-down. For example, the customer list can include a link that when activated shows a list of content provided by the device to a customer in the list, and can include a link that when activated shows statistical information regarding interaction between the device and a customer in the list. For example, the statistical information can include a content hit ratio, a bandwidth usage, a total number of bytes sent to the customer, and threshold settings. The information can be provided in numerical or alphanumeric form, in bar-graph form, and/or in any other appropriate form. Clicking on a cell entry in the Portal column of the device table of FIG. 8 can open access to the corresponding device through the device's Web User Interface, which among other things can show a configuration of the device.

FIG. 9 shows an example of the FIG. 2 application(s) 212 table in the operations tier 205. In accordance with exemplary embodiments, the FIG. 9 table shows a summary view of applications and/or application servers in the network, allows access to details regarding status and events via "drill-down" (for example, configuration and launch information), allows access to reports pertaining to health of applications, subsystems and/or devices in the network, allows display of application-related contents, and provides a network topology locator.

In the application(s) table shown in FIG. 9, each row corresponds to an application or application server, and the columns include cells indicating different features or aspects of the applications/application servers. For example, for applications/application servers in the network, the table can indicate or provide a link (for example, a network link) to: a status of the application or server; a type of the application or server; an application name of the application or server; a host name of the application or server; a report associated with the application or server; and a location of the application or server within the network. For example, a first data row in the table of FIG. 9 provides information for an application named “QuickTime”, including: an indication that the application is a streaming-media type application; a host name of “Ovcchi-a.cnd.hp.com”; a link “ViewReports” to a report associated with the application; and a link entitled “Where is it?” in the Network topology locator column.

In exemplary embodiments, the application(s) table of FIG. 9 can include an entry or row of entries for each content device in the network. In exemplary embodiments, links in the table can be activated by double-clicking on them. As those skilled in the art will appreciate, the links can be activated in a variety of ways that when activated will display a location of the device in the network.

In accordance with exemplary embodiments, basic status information can be indicated by a color of the icon or “bullet” in the status cell corresponding to an application or application server, with different colors indicating different status. Right-clicking on (or otherwise activating) the status icon or entry can cause additional details regarding the status of the application or server to be displayed, including for example launch and/or configuration information regarding the application and/or application server. Double-clicking the application name entry can cause the contents of the application or server to be displayed. For example, when the entry “QuickTime” is activated by double-clicking, contents of the streaming server running QuickTime are displayed, for example “Content Documents/Objects”, “Content Categories/Formats”, “Content Sources Information”, “Content Security Police”, “Content Storage Information”, each of which can then be selected to reveal or display additional information. Activating the link “View Reports” for the entry having application name “QuickTime” can display a streaming media analysis report, including statistical data about performance of the application and/or application server, for example a total number of successful requests over a time period, a total number of packets sent/resent over the time period, and a total number of requests over the time period. The data can be displayed in numerical or alphanumerical formats, in bar-graph format, and/or in any other appropriate format. In accordance with exemplary embodiments, the displayed data can also include launch and/or configuration information of the application and/or application server. Activating the link “Where is it?” can cause a network topology to be shown, including a location of the corresponding application or server in the network. The displayed location can be a geographical location (actual or relative) of the application or server within the network, and/or a logical location within the network.

FIG. 10 shows an example of the FIG. 2 protocols table 214 in the operations tier 205 for displaying information regarding protocol status. In accordance with exemplary embodiments, the FIG. 10 table shows a summary view of protocols supporting the network, for example all protocols supporting and/or in use in the network. In accordance with exemplary embodiments, the protocols table 214 can show status of the protocols, names of the protocols, lists of all devices in the network using a given protocol or given protocols at any given site, can display protocol statistics (for example, with respect to the WCCP protocol a number of leave/joins, an indication of load, etc., and with respect to the ESI protocol a number of page builds, and so forth) as well as historical and trend reports. In accordance with exemplary embodiments, the protocols table 214 also allows access to details regarding status, devices and statistics via “drill-down” by selecting or otherwise activating entries or links in the table.

In the protocols table 214 shown in FIG. 10, each row corresponds to a protocol or protocol group, for example a set or subset of devices such as content devices in the network using a particular protocol. Cells in the row indicate different features or aspects relating to the protocol or protocol group. For example, each row can indicate or provide a link (for example, a network link) to: a status of the protocol or protocol group or group of devices using the protocol; a type of the protocol or protocol group or group of devices using the protocol; a list of devices using the protocol or corresponding to the protocol group; statistical information about the protocol or protocol group; a report associated with the protocol or protocol group; and a location of the protocol or protocol group within the network, for example a site. For example, a first data row in the table of FIG. 10 provides information for an protocol group of type WCCP, located at a Houston site. The indication of type for the protocol or protocol group can also indicate a name of the protocol.

In exemplary embodiments, the protocols table of FIG. 10 can include an entry or row of entries for each protocol or protocol group in the network. In exemplary embodiments, links in the table can be activated by double-clicking on them. As those skilled in the art will appreciate, the links can be activated in a variety of ways that when activated will display a location of the device in the network.

In accordance with exemplary embodiments, basic status information can be indicated by a color of the icon or “bullet” in the status cell corresponding to a protocol or protocol group, with different colors indicating different status. Right-clicking on (or otherwise activating) the status icon or entry can cause additional details regarding status and/or events of the group or protocol group to be displayed. Activating the “Device List” cell entry can cause a list of devices using the protocol at the site indicated in the Site column cell, to be displayed. Activating the “RT Stats” cell entry in the “Real Time Stats” column can cause statistics regarding the protocol at the site to be displayed. For example, where the protocol is WCCP, the displayed statistical information can include an indication of present load, a number of joins/leaves, etc. Activating the “View Reports” cell entry in the “Reports” column can cause display of reports including, for example, historical/statistical/trend data regarding performance and/or usage information, in numeric, alphanumeric, bar-graph, and/or any other appropriate format. Activating the cell entry in the Site column can cause additional information regarding the corresponding site to be displayed, for example a geographic location (actual or relative) or a logical location of the site within the network.

Figure 11:
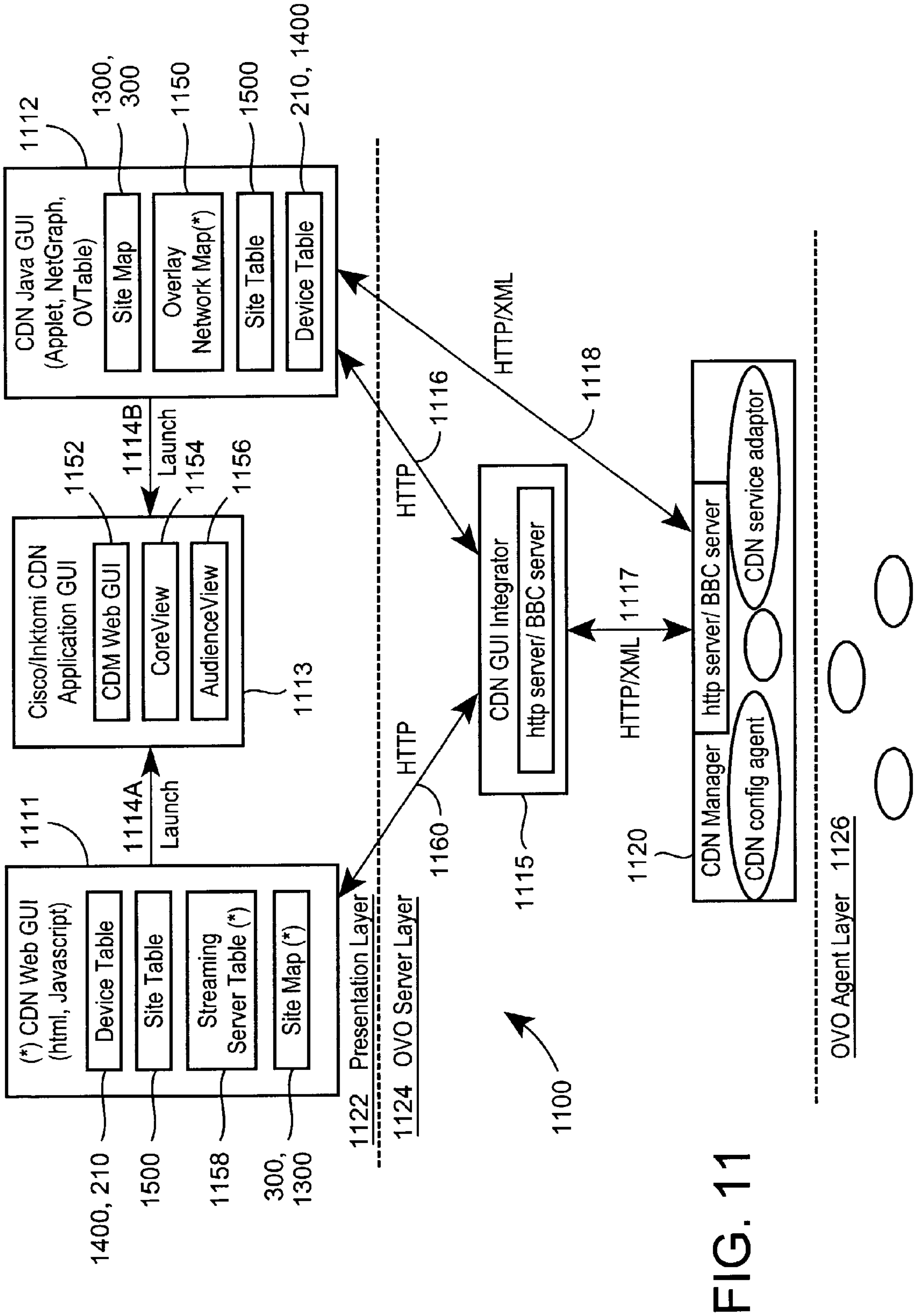
FIG. 11 illustrates an exemplary system architecture 1100.

FIG. 11 illustrates an exemplary system architecture for monitoring a content delivery network, for example by performing the method shown in FIG. 1 to gather, organize and display information such as that described with respect to FIG. 2, where the system includes a computer configured to obtain data from devices within the network, and organize the data into hierarchically accessible tiers. The computer can be, for example, the CDN GUI Integrator 1115 and/or the CDN Manager 1120 shown in FIG. 11. As used herein, “computer” can be a microprocessor, computer system, or any other computing device, and can be implemented in hardware and/or software, in a single physical location or in distributed fashion among various locations or host computing platforms. The system also includes a display for displaying at least part of the data at one of the hierarchal tiers, wherein the hierarchical tiers include a) a site tier map of those devices that are potential content sources in the network, b) a service tier map of content-based relationships among the content sources, and c) an operations tier map of characteristics of the content sources and characteristics of relationships between the content sources and content in the network, wherein the computer is configured to provide the organized data to the display. The display can include, for example, the CDN Web GUI 1111, and/or the CDN Application GUI 1113, and/or the CDN Java GUI 1112 shown in FIG. 11. The display can implemented using a Liquid Crystal Display (LCD), a Cathode Ray Tube (CRT) display, or any other type of display.

FIG. 11 shows a presentation layer 1122 having the CDN Web GUI (Graphical User Interface) 1111, the Application GUI 1113, and the CDN Java GUI 1112. FIG. 11 also shows a Hewlett-Packard OVO (OpenView Operations) Server Layer 1124 including a CDN GUI Integrator 1115 and a CDN Manager 1120. FIG. 11 also shows an OVO Agent Layer 1126.

Figure 13:
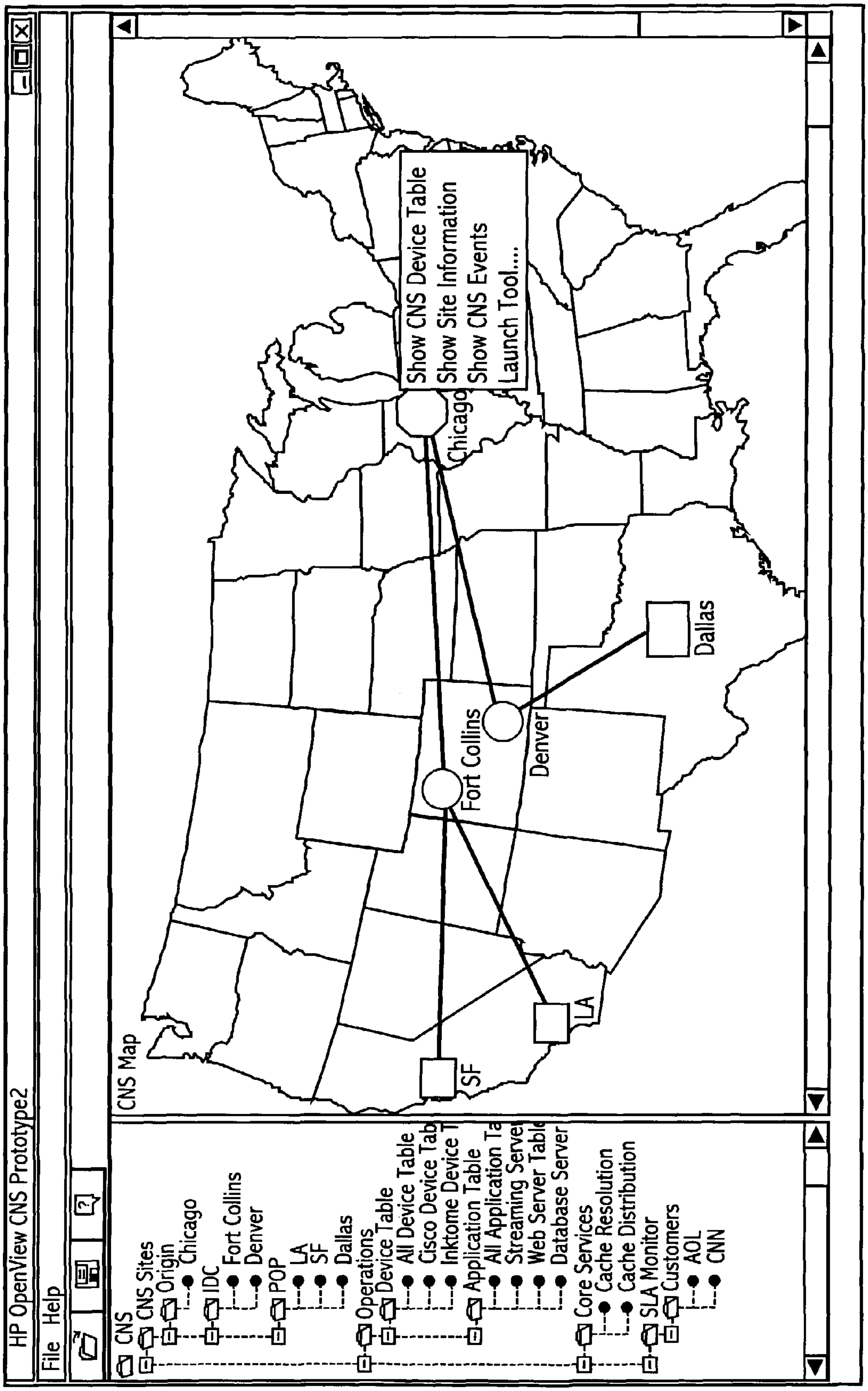
FIG. 13 shows an exemplary site map 1300 in accordance with an exemplary embodiment.

In an exemplary embodiment the CDN Web GUI 1111 is dynamically generated by the CDN Integrator 1115 to provide HTML-based GUIs for a CDN devices table (for example, the FIG. 2, FIG. 8 devices table 210), site table (for example, the FIG. 15 site table 1500, for use in generating the site maps shown in FIGS. 3 and 13), streaming server table 1158 (for example, for use in gathering streaming media information 206) and site map (for example, tables 300, 1300 of FIG. 3 and FIG. 13). The streaming server table 1158 can provide a list of streaming servers, for example RealSystem server(s) and/or QuickTime server(s); which can be shown in the FIG. 15 site table 1500. In an exemplary embodiment, the CDN Integrator 1115 can dynamically generate multiple Web GUIs 1111. The CDN Web GUI 1111 can be implemented as an application which runs in a web browser.

The Java-based GUI 1112 provides user interfaces for the CDN site map 300, 1300, IP overlay network map 1150, device table 210, 1400, and site table 1500, and also provides a drill-down menu, that can be activated for example by right-clicking on icons displayed in the user interface(s). The Java GUI 1112 can be, for example, a Java application or Java Applet. The end user can install the executable CDN byte code and JVM (Java Virtual Machine) on the local system. The Java applet can be invoked from a Web browser using an appropriate Java plug-in to run the CDN Java applet. In an exemplary embodiment, the CDN Java GUI runs as a Java Application instead of a Java Applet. Since OVO (OpenView Operations) Java GUI is a Java Application, the Java GUI 1112 can be implemented as an application, for example a stand-alone application. This can avoid problems with handling different browser versions and different plug-in versions. NetGraph APIs (Application Programming Interfaces) can be used to implement the site map. OVTable APIs can be used to implement the site and device tables. The Java GUI 1112 can obtain the Overlay Network Map 1150 from a Hewlett Packard (HP) OpenView Network Node Manager (NNM). The Overlay Network Map 1150 can show CDN devices overlaying an IP network map.

The site map, such as the site map of FIGS. 3 and 13 allows users to access drill-down device table information, for example by double clicking on the site icon, or by any appropriate mechanism. The site map can also be viewed in different formats, for example as a geographical map display (see FIG. 3), in a tabular form, and so forth. In an exemplary embodiment, right-clicking on the site map will bring up a pop-up menu to allow viewing the site map in tabular form or to all display device table.

In an exemplary embodiment, the Web GUI 1111 and/or the Java GUI 1112 can launch the CDN Application GUI 1113 and/or modules or capabilities within the Application GUI 1113, as shown by the pathways 1114A, 1114B. Applications shown in the GUI 1113 can be third-party applications. In an exemplary embodiment, Cisco's CDM Web GUI 1152 and Inktomi's CoreView 1154 and AudienceView 1156 applications can be launched from the CDN Application GUI 1113. These third-party applications shown in the GUI 1113 can be launched or accessed from the Portal column shown in FIG. 8. In exemplary embodiments, both the CDN Web GUI 1111 and the Java GUI 1112 can provide launch points for invoking 3rd party CDN applications, for example Cisco or Inktomi management software.

In exemplary embodiments, the CDN GUI Integrator 1115 is the CDN GUI engine, which produces all CDN-specific Web GUI(s) and Java GUI(s), for example those that are not supported by OVO. The CDN GUI Integrator 1115 can include, for example, an XSLT (Extensible Stylesheet Language Transformations) engine to translate XML (extensible Markup Language) data based on specified stylesheets into HTML pages for the CDN Web GUI. In accordance with exemplary embodiments, the CDN GUI Integrator 1115 hosts or includes an HTTP (Hyper Text Transfer Protocol) server and has a servlet engine to accept HTTP requests from end users. In accordance with exemplary embodiments, the GUI Integrator 1115 processes a user's HTTP request, sends the request to CDN Manager 1120 via a link 1117 to obtain the requested information, receive the responses, which are XML-formatted data, from CDN Manager 1120, translates the XML-formatted data, and processes and filters the data as necessary for display.

The GUI Integrator 1115 can communicate with the Web GUI(s) 1111 and the Java GUI(s) 1112 via links 1160, 1116 as shown in FIG. 11. In accordance with exemplary embodiments, the communication between the CDN GUIs and the GUI Integrator via the links 1160, 1116 is HTTP-based. In accordance with exemplary embodiments, the Web GUI 1111 is HTML-based and embeds HTTP requests in its item links. A Java application or applet in operation via the Java GUI 1112 can use a URL (Uniform Resource Locator or World-Wide-Web address) connection or connection application to connect back to the HTTP server of the GUI Integrator 1115 for new requests or additional data.

In exemplary embodiments, the Java GUI(s) 1112 communicates directly with the CDN Manager 1120 via a link 1118 that bypasses the GUI Integrator 1115. As with the links 1160, 1116, in accordance with exemplary embodiments, communications via the link 1118 are HTTP-based with XML-formatted data and messages.

There can be different types of communication interfaces between the GUI Integrator 1115 and the CDN Manager 1120, including for example API (Application Program (ming) Interface)-based, HTTP-based, and SOAP (Simple Object Access Protocol (an XML protocol))-based.

In situations where the GUI Integrator 1115 and the CDN Manager 1120 exist on different systems, the communication between the CDN Integrator and CDN Manager can be HTTP-based. An HTTP request can accompany short messages and doesn't require a response. HTTP requests sent by the GUI Integrator 1115 can involve a response with XML-formatted data. In accordance with exemplary embodiments, the response body of the HTTP request is XML-formatted with tags that are recognized by the GUI Integrator 1115. In accordance with exemplary embodiments, the HTTP-based interface mechanism is through HTTP request. Both the CDN Integrator 1115 module and the CDN Manager 1120 module support or host an HTTP server (or a BBC server), which allows the modules to communicate both ways with each other through HTTP requests and allows polling or pushing from either module.

The following examples show an initial set of HTTP request protocols sent by CDN Integrator 1115 to CDN Manager 1120, in accordance with exemplary embodiments:

"http://cdnManagerhttpserver:portNum/cdnManager?command=getCDNData" is a request that allows the CDN GUI Integrator 1115 to obtain a complete set of CDN XML-formatted data from the CDN Manager 1120. The complete set of CDN XML data includes all CDN device info and CDN sites.

"http://cdnManagerhttpserver:portNum/cdnManager?command=getCDNUpdates is a command that allows the CDN GUI Integrator 1115 to request a list of devices that have been updated on status from the CDN Manager 1120. The returned list is XML-formatted. This API will support a parking mechanism in an exemplary embodiment.

"http://cdnManagerhttpserver:portNum/cdnManager?command=getAllCDNDevices" allows the GUI Integrator 1115 to get all CDN devices from CDN Manager 1120 that are being managed.

"http://cdnManagerhttpserver:portNum/cdnManager?command=getCDNTopInfo" allows the GUI Integrator 1115 to get CDN topology information from the CDN Manager 1120, for example configuration information from Inktomi and policy information from Cisco.

"http://cdnManagerhttpserver:portNum/cdnManager?command=getCDNTopInfo&vendor=cisco" requests CDN topology information specific to Cisco.

"http://cdnManagerhttpserver:portNum/cdnManager?command=getCDNTopInfo&vendor=inktomi" requests CDN topology information specific to Inktomi.

"http://cdnManagerhttpserver:portNum/cdnManager?command=getCDNReportInfo" requests CDN generic report information.

"http://cdnManagerhttpserver:portNum/cdnManager?command=getCDNUpdateStatus" requests real-time update on CDN device status.

http://cdnManagerhttpserver:portNum/cdnManager?command=getCDNDevices&vendor=cisco" requests a list of Cisco CDN devices.

"http://cdnManagerhttpserver:portNum/cdnManager?command=getCDNDevices&vendor=inktomi" requests a list of CDN devices that run Inktomi CDN software.

"http://cdnManagerhttpserver:portNum/cdnManager?command=getAllCDNApplications" requests a list of all CDN application servers including Web server, Streaming server, database server, etc.

"http://cdnManagerhttpserver:portNum/cdnManager?command=getApplication&type=streaming" requests a list of CDN streaming servers.

In accordance with exemplary embodiments, an initial set of HTTP request protocols sent by the CDN Manager 1120 to CDN Integrator may look like the following: a) "http://cdnIntegratorhttpserver:portNum/cdnIntegrator?msg=deviceUpdate&device=deviceName&status=down", which informs the CDN GUI integrator 1115 that some device statuses have been updated; and b) "http://cdnIntegratorhttpserver:portNum/cdnIntegrator?msg=configUpdate", which informs the CDN integrator 1115 that there are some CDN configuration changes.

In accordance with exemplary embodiments, in situations where both GUI Integrator 1115 and the CDN Manager 1120 exist on the same system, the GUI Integrator 1115 can directly invoke Java-based API's provided by the CDN Manager 1120 to obtain the XML-formatted data that the GUI Integrator 1115 needs, for example to comply with requests received from the Web GUI(s) 1111 and/or the Java GUI(s) 1112. In this configuration, the GUI Integrator 1115 can provide or host one HTTP server, to handle the end user requests received via the Web GUI 1111. In exemplary embodiments, the CDN Manager 1120 provides the following Java APIs:

"CDNManager.getCDNData( )" returns XML-formatted data containing the complete set of CDN XML data. This API allows the CDN GUI Integrator 1115 to get the complete set of CDN XML-formatted data from CDN Manager 1120. The complete set of CDN XML data can include, for example, all CDN device info and CDN sites.

"CDNManager.getCDNUpdates( )" returns a list of devices that have been updated on status. The returned list is XML-formatted.

"CDNManager.getCDNUpdateStatus(device)" returns the update status on the specified device.

"CDNManager.getAllCDNDevices( )" returns a List or ArrayList of all CDN devices.

"CDNManager.getCDNTopInfo( )" returns the CDN topology information, i.e. configuration info from Inktomi and policy info from Cisco.

"CDNManager.getCDNTopInfo(vendor)" returns CDN topology information regarding specified vendor.

"CDNManager.getCDNReportInfo( )" returns CDN generic report information.

"CDNManager.getCDNDevices(vendor)" returns a list of vendor devices.

"CDNManager.getAllCDNApplications( )" returns a list of CDN applications.

"CDNManager.getAllCDNApplications(type)" returns a list of specific type of applications, for example streaming servers, Web servers, database servers.

In accordance with exemplary embodiments, the GUI Integrator 1115 can provide the following Java APIs:

"CDNIntegrator.deviceUpdate(device)"—to allow updating the device status.

"CDNIntegrator.configUpdate( )"—to allow updating the configuration information.

In accordance with exemplary embodiments, the following two HTTP-based interfaces can be sent by GUI Integrator 1115 to the CDN Manager 1120 to obtain XML-formatted CDN data for presentation:

"http://cdnManagerhttpserver:portNum/cdnManager?command=getCDNData", which allows CDN GUI Integrator 1115 to obtain the complete set of CDN XML-formatted data from the CDN Manager 1120. The complete set of CDN XML data includes all CDN device information and CDN sites.

"http://cdnManagerhttpserver:portNum/cdnManager?command=getCDNUpdates" allows the CDN GUI Integrator 1115 to obtain from the CDN Manager 1120 a list of devices that have been updated on status. The returned list is XML-formatted. In accordance with exemplary embodiments, this API supports a parking mechanism.

The following table shows an initial set of data in accordance with exemplary embodiments. The table shows information that can be contained in each CDN device, CDN site map and streaming server. The data is organized into the hierarchical layers, i.e. site and device layers, to provide the drill down information. These attributes can be shown in a GUI. Some of the attributes are for internal use within the system, for example the ID attribute for a CDN device can be used to uniquely identify the device internally in the software code. This initial set of data provides drill-down information from the hierarchical model.

TABLE 1

Initial Set of Data

| Category | Elements/ Attributes | Data examples | Data sources or created by |
|---|---|---|---|
| CDNDevice (or CDNService) | ID | Unique CDN generated device id | OV CDN |
| | Dns Name | Fully qualified DNS name | Device config |
| | IP | IP address (may be multiple IP addr) | Device config |
| | Label | Traffic Server, Media Bridge, CDS, CDM, Content Engine, Content Router. | OV CDN or device config |
| | Status | Normal, critical, warning | Device status |
| | Type | Cache, Streaming, Distribution | OV CDN or device information |
| | Description | Comments or detailed device description | Device config |
| | Portal | URL links to access the device or launch Web tools. | Device config |
| | Report | URL link to report html page | OV CDN |
| | Site | Site names, e.g. Fort Collins, LA | Device config or OV CDN config |
| | Location | X, Y location to show where the device is located. | OV CDN or deployment config |
| | Vendor | Inktomi, Cisco | Device config |
| | StatusInfo | Detailed device information | Device status and OV CDN |
| | Events | A list of device events | Device info, OV CDN, or OVO |
| | Event | Event message | Device info, OV CDN, or OVO |
| | Connected Devices | Contains a list of CDN "Device/ ID" that this CDN device connects to | OV CDN examples <ConnectedDev> <Dev id=1/> <Dev id=8/> </ConnectedDev> |
| | Device/ID | CDN Device with its id | e.g. <Dev id=1/> |

TABLE 1-continued

Initial Set of Data

| Category | Elements/ Attributes | Data examples | Data sources or created by |
|---|---|---|---|
| CDNSite | ID | Unique CDN generated site id. Site is a logical CDN group that consists of a group of CDN devices. | OV CDN |
| | Label | Name for the site, ex "Fort Collins", "LA" | OV CDN or deployment config |
| | Status | Propagate status - critical, normal, warning | OV CDN |
| | Type | IDC, POP, Origin, Traffic Controller, Traffic Core, Traffic Edge | OV CDN |
| | Location | The site location, can be well-known city names | OV CDN or deployment config |
| | StatusInfo | General site information | OV CDN |
| | Devices | Contains a list of "Device/ ID" for the site (the site components) | OV CDN, e.g. <Devices> <Device id=1> <Device id=8> </Devices> |
| | Device/ID | CDN Device with its id | e.g. <Device id=1> |
| | ConnectedSites | Contains a list of CDN "Site/ ID" that it connects to, logically or physically | OV CDN, e.g. <ConnectedSites> <Site id=1> <Site id=2> </ConnectedSites > |
| | Site/ID | CDN site with its id | e.g. <Siteid=1> |
| | Description | Comments or site description | Deployment configuration |
| CDNStreaming Server | ID | Unique CDN streaming server id | |
| | DnsName | Fully qualified DNS name | |
| | IP | IP address | |
| | Label | RealSystem, WMT | |
| | Status | Normal, critical, warning | |
| | Type | WMT, RealServer | |
| | Description | Comments or streaming server description | |

TABLE 1-continued

| Initial Set of Data | | | |
|---|---|---|---|
| Category | Elements/ Attributes | Data examples | Data sources or created by |
| | DeviceID | CDN device id on which the streaming server runs | |
| | Clients | The number of clients the streaming server is currently serving | |
| | Streams | The number of streams the streams server is currently serving | |
| | Violations | Misses or violations occurred | |
| | NWView | Links to network map | |

In accordance with exemplary embodiments, the following XML format for CDN data can be used.

```
<!-CDNServices.xml file-->
<?xml version="1.0"?>
<CDNServices>
    <CDNDevices >
    <Device id="2" label="Traffic Server" type="Cache"
        dnsname="ovcdn.cnd.hp.com" status="down">
            <Description>Inktomi Traffic Server
            </Description>
<Portal>http://ovchia.cnd.hp.com:8080/inktomi/CoreView.html
</Portal>
            <Report>http://ovchia.cnd.hp.com/CDN/report/
            index.html</Report>
            <Site id="1"/>
    </Device>
    <Device id="3" label="Media Bridge" type="distribution"
    dnsname="ovcdmb.cnd.hp.com" status="normal">
            <Description>Inktomi Content Management
            </Description>
<Portal>http://ovchia.cnd.hp.com/inktomi/AudienceView.html
</Portal>
            <Report>http://ovchia.cnd.hp.com/CDN/report/
            index.html</Report>
            <Site id="6"/>
    </Device>
    <Device id="7" label="CDS" type="distribution manager"
        dnsname="ovcdncdm.cnd.hp.com" status="Normal">
            <Description>Inktomi Content Distribution
            </Description>
<Portal>http://ovchia.cnd.hp.com:8080/inktomi/Broadcaset.html
</Portal>
            <Report>http://ovchia.cnd.hp.com/CDN/report/
            index.html</Report>
            <Site id="1"/>
    </Device>
    <Device id="8" label="CoreView" type="distribution"
        dnsname="ovcdncv.cnd.hp.com" status="normal">
            <Description>Inktomi Content Management
            </Description>
<Portal>http://ovchia.cnd.hp.com:8080/inktomi/CoreView.html
</Portal>
            <Report></Report>
            <Site id="8"/>
    </Device>
    </CDNDevices>
```

-continued

```
    <CDNSites>
        <Site id="1" label="Fort Collins" type="Traffic Core"
status="Normal">
            <Location> Fort Collins </Location>
            <Description> desrciption </Description>
            <Devices>
                <Device id="1"/>
                <Device id="2"/>
                <Device id="5"/>
                <Device id="8"/>
            </Devices>
            <ConnectedSites>
                <Site id="11"/>
                <Site id="21"/>
            </ConnectedSites>
        </Site>
        <Site id="2" label="Roseville" type="Traffic Edge"
status="Critical">
            <Location> Roseville </Location>
            <Description> desrciption </Description>
            <Devices>
                <Device id="10"/>
                <Device id="20"/>
                <Device id="15"/>
                <Device id="8"/>
            </Devices>
            <ConnectedSites>
                <Site id="16"/>
                <Site id="18"/>
            </ConnectedSites>
        </Site>
    </CDNSites>
</CDNServices>
```

Another example of an XML format for CDN that can be used with exemplary embodiments follows:

```
    <?xml version="1.0"?>
    <CDNConfiguration>
        <ConnectedServers>
            <Server type="BBC">
                <Dnsname> ovchia.cnd.hp.com </Dnsname>
                <Port> 8808 </Port>
            </Server>
            <Server type="Apache">
                <Dnsname> ovchia.cnd.hp.com </Dnsname>
                <Port> 8808 </Port>
            </Server>
            <Server type="OVO">
                <Dnsname> ovchia.cnd.hp.com </Dnsname>
                <Port> 8808 </Port>
            </Server>
        </ConnectedServers>
        <CDNSites>
            <Site id="1" label="Chicago" x="535" y="215" />
            <Site id="2" label="Fort Collins" x="260" y="230" />
            <Site id="3" label="LA" x="90" y="300" />
            <Site id="4" label="SF" x="45" y="220" />
            <Site id="5" label="Denver" x="300" y="270" />
            <Site id="6" label="Dallas" x="360" y="380" />
        </CDNSites>
    </CDNConfiguration>
```

In accordance with exemplary embodiments, the following XML format can be used for delta status updates on CDN objects:

```
    <?xml version="1.0"?>
    <CDNServices>
        <CDNDevices>
            <Device id="2" label="Traffic Server"
            dnsname="ovcdn.cnd.hp.com" status="down">
```

-continued

```
            </Device>
            <Device id="3" label="Media Bridge"
        dnsname="ovcdmb.cnd.hp.com" status="warning">
            </Device>
        </CDNDevices>
    </CDNServices>
```

In accordance with exemplary embodiments, the following XML schema or common set of XML tags can be used by components within the content delivery network:

```
<?xml version="1.0" encoding="UTF-8"?>
<CDNStore>
<CDNDevices>
            <Device dnsname="ovcdnce1.ccd" id="1" label="CE590" status="normal" type="cache">
                <Description>Cisco Content Engine 590</Description>
                <Portal>http://ovcdnce1.cnd.hp.com:8080/index.html</Portal>
                <Location>Denver</Location>
            </Device>
            <Device dnsname="ovcdnce2.ccd" id="2" label="CE7320" status="down" type="cache">
                <Description>Cisco Content Engine 7320</Description>
                <Portal>http://ovcdnce2.cnd.hp.com:8080/index.html</Portal>
                <Location>Denver</Location>
            </Device>
</CDNDevices>
<Sites background__image="">
    <Site id="1" label="Fort Collins" type="origin" status="Normal">
        <Device id="1"/>
        <Device id="2"/>
        <Device id="5"/>
        <Device id="8"/>
    </Site>
    <Site id="3" label="LA" type="POP" status="Normal">
        <Device id="1"/>
        <Device id="2"/>
    </Site>
</Sites>
<CDNApplicationServices>
            <Application dnsname="ccd" id="1" status="normal" type="RealSystem">
            <Description>"RealSystem G2 streaming media server"</Description>
            <DeviceName>ccd</DeviceName>
            <Clients>1084</Clients>
            <Streams>8564</Streams>
            <Violations>20</Violations>
            <NWView>Map</NWView>
            </Application>
            <Application dnsname="ovchia.cnd.hp.com" id="2" status="down" type="RealSystem">
            <Description>"RealSystem G2 streaming media server"</Description>
            <DeviceName>ovchia2.cnd.hp.com</DeviceName>
            <Clients>108400</Clients>
            <Streams>856477</Streams>
            <Violations>2000</Violations>
            <NWView>Map</NWView>
            </Application>
</CDNApplicationServices>
```

</CDNStore>

In accordance with exemplary embodiments, the status (for example, Critical, Warning, Normal) on CDN nodes/site icon in the CDN Map and Device Table can be updated in a variety of ways. For example, in accordance with exemplary embodiments status updates can be a) be operations-based only (OVO), or b) IP-based only (for example, Hewlett Packard Openview Network Node Manager), or based on both OVO operations status and NNM IP status. In accordance with exemplary embodiments, OVO node status can be correlated with NNM (Network Node Manager) node status.

In accordance with exemplary embodiments, if the status in CDN Site Map and Device Table is NNM-based only, then a) CDN objects are made into NNM objects; and/or b) CDN objects are correlated with NNM objects so that when NNM objects obtain updates, the CDN objects get updated too;

and/or c) CDN objects and NNM objects are independent objects and NNM APIs are used to verify if the IP device (for the CDN device) is stored in the NNM top db (if yes, then APIs are used to obtain the status of the device); and/or d) a SNMP trap is employed.

In accordance with exemplary embodiments, if the status in CDN Site Map and Device Table is OVO-based only, then an OVO API can be used to obtain the OVO object or node status. For example, MSI (Message Stream Interface) can be used to intercept OVO messages, and status can then be determined from the OVO messages. Users can use an MSI API to register applications to receive messages on a management server (for example, a server in the CDN Manager 1120). MSI allows users to plug in event correlation engines and statistical analysis tools to establish a link to other network and system management applications. Thus MSI can be used to intercept OVO messages, filter the intercepted messages, and send CDN-related messages to a CDN application (or GUI). As an alternative or in addition to using MSI, in exemplary embodiments the CDN map/device objects are tied to a Service Navigator object, and Service Engine or Service Navigator APIs (Application Programming Interfaces) are used to obtain the status information. In accordance with exemplary embodiments, a poll, for example a status poll, is used to synchronize Service Navigator objects with the CDN objects.

In summary, in accordance with exemplary embodiments there can be an automatic action which sets the status of the matching node in a CDN map, and/or the MSI can intercept the OVO message and update status from that message, and/or status can be obtained from the Service Navigator using Service Navigator APIs. In accordance with exemplary embodiments, the IP status can be obtained by activating the SNMP Trap templates which are designed to accept SNMP traps created by NNM by default. With these templates, it is possible to intercept OV_NODE_DOWN, OV_NODE_UP traps from the NNM to determine status. This can be implemented using MSI and/or automatic action techniques.

In accordance with exemplary embodiments where the CDN status is OVO-based, a CDN status-update action is defined and associated with critical messages for CDN nodes. When a critical event happens for a CDN node, the CDN status-update action is kicked off to send a status update to the GUI Integrator 1115. In accordance with exemplary embodiments, the GUI Integrator 1115 has a (status) server running to receive the updates for the Map.

In accordance with an exemplary embodiment, Service Engine APIs are used to obtain status updates, the CDN maps the CDN Sitemaps and device objects to an OVO Service Map, and the OVO Service Engine maintains the status. In this configuration no status synchronization is provided between CDN objects and service map objects since both types of status information will come from the Service Engine. A status propagation rule can be specified in an OVO Service Map and can also be maintained in the Service Engine. In CDN SiteMap and Device Table, OVO Service Navigator API is used to obtain the status of the service, and/or "ServiceStatusListener" Class is used to obtain status update notification(s). In this embodiment, CDN provides a standard default CDN SiteMap for the CDN Service Map. In a version of this embodiment, the rules defined in the CDN SiteMap are only modified by a System Integrator (e.g., a person who administers and sets up OpenView products) and are not modified by the operators. Also, operators do not add or modify the CDN Site Tree via the Service Navigator. The Site tree is modified using a CDN Configuration GUI to add new CDN objects. When new CDN objects are added to CDN map or table through the CDN Configuration GUI, synchronization with the Service Engine can be done to automatically update the CDN Site Map.

Figure 12:
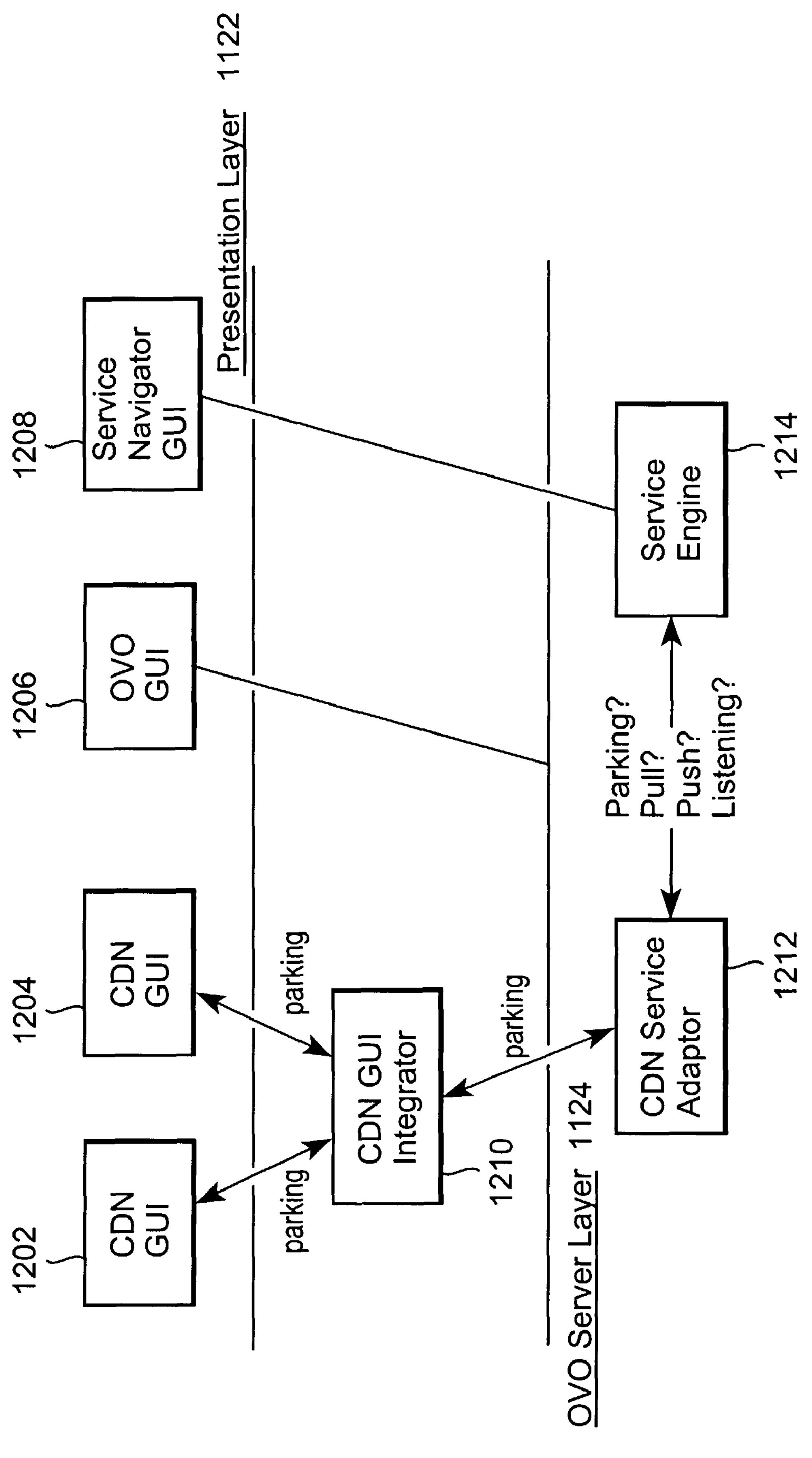
FIG. 12 shows a mechanism whereby real-time status updates are obtained from an OVO service engine, in accordance with an exemplary embodiment.

FIG. 12 shows CDN GUIs 1202, 1204, an OVO GUI 1206, and a Service Navigator GUI 1208 in the presentation layer 1122, and the CDN GUI Integrator 1210 along with the CDN Service Adaptor 1212 and the Service Engine 1214 in the OVO Server layer 1124. The Service Engine 1214 can be implemented as a core component of Hewlett Packard (HP) OpenView Service Navigator, which is an add-on component of HP OpenView Operations (OVO) Java-based operator GUI. When a problem occurs, the Service Engine can map OVO messages to the service affected by the problem, and can send the OVO messages to a user responsible for the service.

In accordance with exemplary embodiments, the GUI Integrator 1210 (which can be the same as the FIG. 11 GUI Integrator 1115) retrieves the status from the CDN Service Adaptor 1212. In exemplary embodiments, the GUI Integrator 1210 is integrated with the CDN Manager 1120 and/or the CDN Service Adaptor 1212 to obtain status updates. In exemplary embodiments, the GUI Integrator 1210 is integrated into an OVO framework and infrastructure, to establish context-sensitive connection with OVO and NNM.

In accordance with exemplary embodiments, the status is retrieved using a parking mechanism, for example as implemented in the Hewlett Packard (HP) OpenView Network Node Manager (NNM), wherein the GUI Integrator 1210 opens an HTTP connection and does a "Get" and waits for status updates. The GUI Integrator 1210 keeps the connection until status comes. For example, the CDN GUIs 1202, 1204 and the GUI Integrator 1210 can be remotely located in different systems. The CDN GUIs 1202, 1204 can show status of CDN devices, for example Critical, Normal, Warning or Major. The device updated status can be retrieved from the OVO Service Engine 1214 to show the real-time status of devices in the GUI (e.g., 1202, 1204). The parking mechanism can effectively communicate the status update to the CDN GUIs 1202, 1204. For example, the GUI Integrator 1210 can initially have a Normal status for a device. In order to show the real-time status for the device, the GUI Integrator 1210 can open an HTTP connection to the Service Adaptor 1212 and can send a HTTP request to CDN Service Adaptor to get device status updates. If there is no status change for the device, the Service Adaptor 1212 can refrain from sending any responses back to the GUI Integrator 1210, while keeping the connection open until it receives the status change from the Service Engine 1214. The Service Adaptor 1212 can then send the status updates to the GUI Integrator 1210. Thus, a parking mechanism can enable status updates to be retrieved in a timely manner. In exemplary embodiments, in combination with or as alternative to the parking mechanism, a) updates can be pulled from the Service Engine 1214, for example at a scheduled interval, and/or b) status updates can be pushed to the 1212 Service Adaptor from the Service Engine 1214.

The parking mechanism can be implemented, for example, using HPAS (HP Application Server) or BBC (Black-Box Communication). HPAS is an HP Middleware product that is a server configured to support J2EE (Java 2 Enterprise Edition) standards, and can support other technologies. BBC can be implemented as an HTTP 1.1-based communications interface for OpenView client and server applications. BBC can provide an API (Application Programming Interface) that allows applications to send and retrieve data between heterogeneous systems. In accordance with exemplary embodiments, a thread server hosts a status-updated thread.

When status gets updated, the Service Adaptor 1212 sends the updated states to all waiting connections. For example, the site objects are logic nodes; each site note contains a group of CDN devices or applications. The sites can be discovered automatically through configuration or deployment information, or can be manually added using a CDN Configuration GUI. Users can drill into a site object to see a table of CDN devices for the site, or can select other options for the selected site (for example by right-clicking on an icon of the site object to expose a menu of options). Connection lines among the displayed objects can represent content distribution relationships.

In accordance with exemplary embodiments, OpenView Foundation NetGraph APIs and the Java Swing package are used to implement the Site Map, but other GUI building tools can be used to create the maps and information displays consistent with the exemplary embodiments. The CDN GUI client receives the complete CDN XML data, parses the data and store the data in its in-memory data structure to provide quick access for drill-down information, for example via double-click and pop-up menu mechanisms. In accordance with exemplary embodiments, a CDN NetGraph stylesheet forms the base for the map graphical implementation and is part of the CDN Java GUI 1112. The CDN NetGraph stylesheet is independent of the CDN data. The CDN NetGraph stylesheet enables use of NetGraph APIs to dynamically create the nodes and connections based on the CDN data that the Java GUI 1112 received from CDN Manager. In accordance with exemplary embodiments, the following stylesheet for the nodes and connection style, can be used and is called “CDNStyle.xml”:

```
<NetGraph>
    <GraphStyle id="gs1">
            <Layout id="6">
                <LayoutStyleReference id="none"/>
            </Layout>
            <Background id="3">
                <BackgroundImage id="3" uri="usa.gif">
                    <BackgroundImageStyleReference id="map"/>
                </BackgroundImage>
            </Background>
    </GraphStyle>
    <GraphStyle id="gs18">
        <Layout id="6">
            <LayoutStyleReference id="none"/>
        </Layout>
        <Background id="3">
            <BackgroundImage id="3" uri="cdn_usa.gif">
                <BackgroundImageStyleReference id="map"/>
            </BackgroundImage>
        </Background>
    </GraphStyle>
    <GraphStyleReference id="gs1"/>
    <BackgroundImageStyle id="bgis" placement="Centered"/>
    <BackgroundImageStyle id="map"
                placement="stretched"
                coordinateSystem="world"/>
    <LineStyle id="DEFAULT" type="solid" thickness="2" />
    <EdgeStyle id="city2city">
        <Line lineStyleId= "DEFAULT"/>
    </EdgeStyle>
    <ShapeStyle id="Core" type="Ellipse"/>
    <ShapeStyle id="ES" type="Rectangle"/>
    <ShapeStyle id="CDS" type="Octagon"/>
    <ShapeStyle id="Normal" color="green"/>
    <ShapeStyle id="Critical" color="red"/>
    <ShapeStyle id="Major" color="orange"/>
    <ShapeStyle id="Warning" color="yellow"/>
    <ShapeStyle id="Marginal" color="blue"/>
    <NodeStyle id="Normal">
        <Shape shapeStyleId="Normal"/>
    </NodeStyle>
    <NodeStyle id="Critical">
            <Shape shapeStyleId="Critical"/>
    </NodeStyle>
    <NodeStyle id="Major">
            <Shape shapeStyleId="Major"/>
    </NodeStyle>
    <NodeStyle id="Warning">
            <Shape shapeStyleId="Warning"/>
    </NodeStyle>
    <NodeStyle id="Marginal">
            <Shape shapeStyleId="Marginal"/>
    </NodeStyle>
    <NodeStyle id="CDS">
        <Image uri="nodes.gif"/>
        <Shape shapeStyleId="CDS"/>
    </NodeStyle>
    <NodeStyle id="ES">
        <Image uri="host.gif"/>
        <Shape shapeStyleId="ES"/>
    </NodeStyle>
    <NodeStyle id="Core">
        <Image uri="node.gif"/>
        <Shape shapeStyleId="Core"/>
    </NodeStyle>
    <NodeStyle id="City">
```

-continued

```
<Label>
            <Text>
                <AuxiliaryDataReference name="city"/>
            </Text>
        </Label>
        <ToolTip>
                <AuxiliaryDataReference name="city"/>
        </ToolTip>
    </NodeStyle>
</NetGraph>
```

Example Netgraph APIs that can be used with exemplary embodiments include:

```
NetGraphNode chicago=netgraph.addNode("Chicago");
    chicago.putAuxiliaryData("city", new NetGraphTextAuxiliaryData("city", "Chicago"));
    chicago.putAuxiliaryData("status", new NetGraphTextAuxiliaryData("status", "Normal"));
    chicago.addStyle("CDS");
    chicago.addStyle("City");
    chicago.addStyle("Normal");
    chicago.setX(CHICAGO_X);
    chicago.setY(CHICAGO_Y);
NetGraphNode Ft=netgraph.addNode("FtCollins");
    Ft.putAuxiliaryData("city", new NetGraphTextAuxiliaryData("city", "Fort Collins"));
    Ft.addStyle("Core");
    Ft.addStyle("City");
    Ft.addStyle("Normal");
    Ft.setX(FT_X);
    Ft.setY(FT_Y);
NetGraphEdge chicago2Ft=netgraph.connect(chicago, Ft, "chicago2Ft");
    chicago2Ft.addStyle("city2city");
```

FIG. 13 shows an exemplary site map in accordance with embodiments, where for example drill-down information can be obtained by clicking on icons in the geographic map and/or by selecting items in the accompanying exemplary hierarchical outline. As shown in FIG. 13, the outline includes elements for Sites, Operations, Core Services and SLA Monitor in the CDN network. For example, Sites of type Origin, IDC, and POP can be selected and shown or displayed. Operations information such as Device Table, Application Table and corresponding information subsets can be selected and shown or displayed. Core Services, including the subsets Cache Resolution and Cache Distribution can be selected and shown or displayed. SLA Monitor, including Customers and subsets of customers such as AOL customers, CNN customers, etc. can be selected and shown or displayed.

Figure 15:
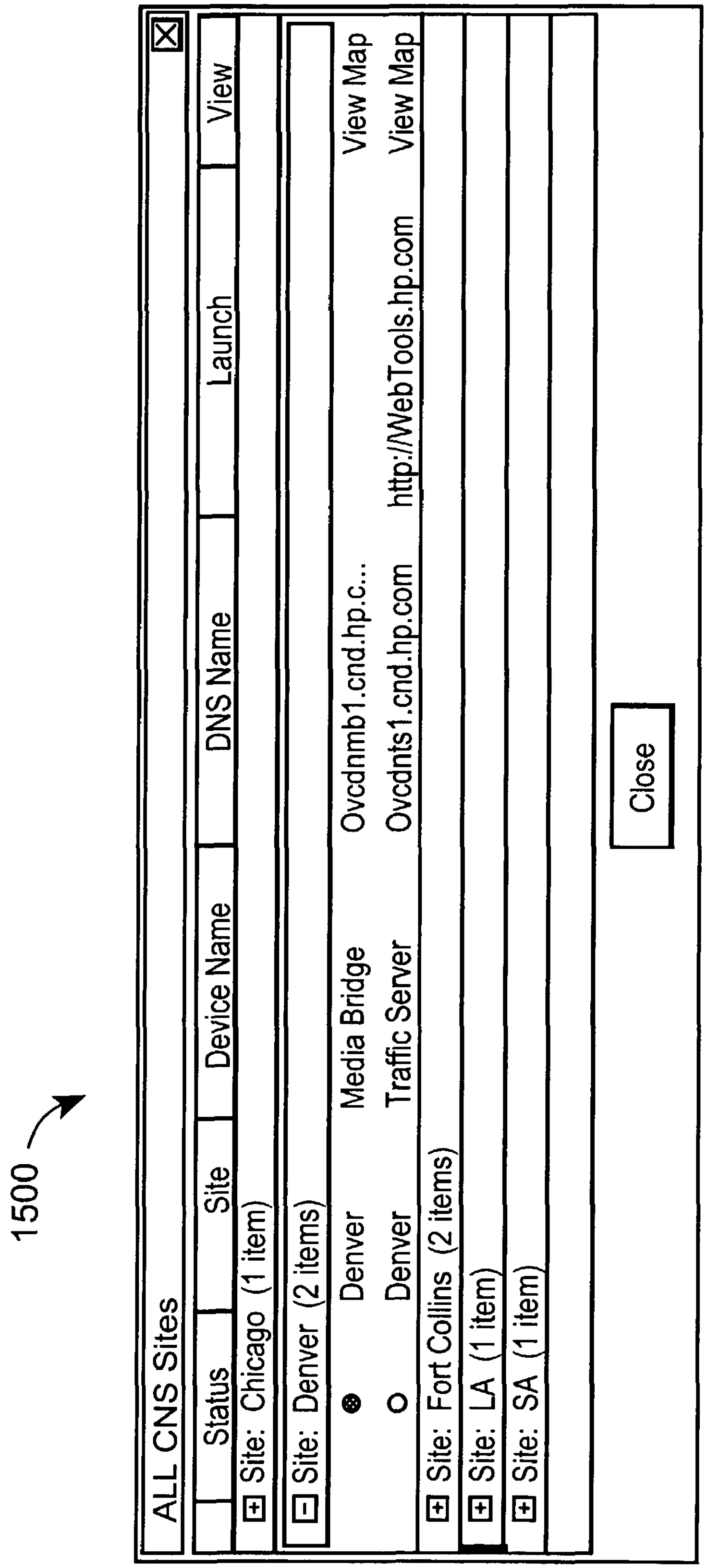
FIG. 15 shows an exemplary network site list or table 1500, in accordance with an exemplary embodiment.

FIGS. 14-15 show exemplary displays of “ALL CDN Device Table” and “All CDN Sites” respectively, in a list format. Listings of CDN devices in the network can be filtered or grouped and then displayed by sites, device names or status. For example, listings or references in a device table can be grouped by sites to show the Site Table. In accordance with exemplary embodiments, the device table displays the status for each device, the site where this device exists, the device name, the host DNS name where the device runs, the portal launch point to launch the portal home page for the device and the link to locate the object in the NNM IP Map.

In accordance with exemplary embodiments, when a status cell corresponding to a device (such as the status cells shown in FIGS. 14-15) is clicked, an OVO Node map window that contains the CDN objects will pop up. Users then can right-click the node to obtain messages and other information such as status information associated with the node, provided by OVO.

In accordance with exemplary embodiments, when a site cell corresponding to a device (such as the site cells shown in FIGS. 14-15) is clicked, an OVO Node Group map window that contains the CDN site object pops up. Users can then select the node group, for example by right-clicking, to obtain more information associated with the node group provided by OVO.

In accordance with exemplary embodiments, when a cell in the DNS Name column (shown for example in FIGS. 14-15) is selected for example by clicking on it, an application such as CDN Reporter is invoked to bring up the home page of the CDN reports in a Web browser, for example via the Web GUI 1111.

In accordance with exemplary embodiments, cells in the Launch column (shown for example in FIGS. 14-15) show URLs (Uniform Resource Locators). When one of these cells is selected for example by clicking on it, a default Web browser is invoked to access the website corresponding to the URL listed in the cell. In summary, the Launch column provides URLs to access the corresponding devices through their Web GUIs.

In accordance with exemplary embodiments, cells in the View column (shown for example in FIGS. 14-15) allow the corresponding CDN object to be located in a NNM IP Map. When a cell in this column is selected, for example by clicking on it, several actions occur: 1) the DNS name or IP of the device is used in NNM APIs to obtain the unique NNM object id from the NNM object database; 2) the NNM object id is used to find corresponding map symbols, for example from the NNM Map; 3) the symbols are used to identify a list of submaps that contain the CDN object; and 4) users can then select a submap among the list of submaps to view the IP location of the device. The symbols are data structures representing CDN devices or sites on the NNM network map, for example the symbols shown in FIGS. 3 and 13.

In accordance with exemplary embodiments, OV Foundation OVtable APIs and the Java Swing package are used to implement the Device and Site Table. Table model and different column renderers are used to implement table columns such as the Status, Launch, and View columns showwn in FIGS. 14-15.

Those skilled in the art will also appreciate that software, including instructions for causing a computing device or system to perform the methods or processes disclosed herein, can be stored on a machine-readable medium.

It will be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

The invention claimed is:

1. A method for monitoring a content delivery network, comprising:

obtaining data from devices within the network;

organizing the data into hierarchically accessible tiers; and displaying at least one of content distribution information, content resolution information, and streaming media information graphically mapped to the network in relation to geographic locations using at least part of the data at one of the hierarchically accessible tiers; wherein the hierarchically accessible tiers include a) a site tier including a map of geographic locations of those devices that are potential content sources in the network;

b) a service tier including a map of content-based relationships among the content sources; and c) an operations tier including a map of characteristics of the content sources and characteristics of relationships between the content sources and content in the network.

2. The method of claim 1, wherein the operations tier includes configuration and launch information regarding content devices and content delivery applications within the network.

3. The method of claim 2, wherein the operations tier comprises a table indicating content devices in the network.

4. The method of claim 3, wherein the table indicates for each device in the network a status of the device, a type of the device, a name of the device, a domain name server (DNS) name of the device, a list of customers connected to the device, a portal associated with the device, and a location of the device in the network.

5. The method of claim 4, wherein the location is a logical location of the device in the network.

6. The method of claim 4, wherein the location is a geographical location of the device in the network.

7. The method of claim 3, wherein the table includes for each device in the network links to a) a status of the device, b) a type of the device, c) a name of the device, d) a domain name server (DNS) name of the device, e) a list of customers connected to the device, f) a portal associated with the device, and g) a location of the device in the network.

8. The method of claim 1, wherein the operations tier comprises a table indicating applications and/or application servers in the network.

9. The method of claim 8, wherein the table indicates for each application and/or application server on the network a status, a type, a name, a host name, a report, and a location in the network.

10. The method of claim 8, wherein the report indicates statistical data about performance of the application and/or application server.

11. The method of claim 8, wherein the table indicates for each application and/or application server on the network, links to a) a status, b) a type, c) a name, d) a host name, e) a report, and f) a location in the network.

12. The method of claim 1, wherein the site tier map includes at least one of an origin site, a point of presence site, and a communication service provider.

13. The method of claim 12, wherein the site tier map indicates locations of content sources within the network.

14. The method of claim 1, wherein the operations tier comprises a table indicating protocols supporting the network.

15. The method of claim 14, wherein the table indicates for each protocol, at least one of: a status, a type, a list of devices in the network using the protocol, statistical information about the protocol, and locations of devices in the network using the protocol.

16. The method of claim 1, comprising:

shifting a display among the hierarchically accessible tiers.

17. The method of claim 1, wherein the service tier includes maps of content resolution, content distribution, and streaming media communication paths.

18. A system for monitoring a content delivery network, comprising:

a computer configured to obtain data from devices within the network, and organize the data into hierarchically accessible tiers; and a display for displaying at least one of content distribution information, content resolution information, and streaming media information graphically mapped to the network in relation to geographic locations using at least part of the data at one of the hierarchically accessible tiers, wherein the hierarchically accessible tiers include a) a site tier map of geographic locations of those devices that are potential content sources in the network;

b) a service tier map of content-based relationships among the content sources; and c) an operations tier map of characteristics of the content sources and characteristics of relationships between the content sources and content in the network;

wherein the computer is configured to provide the organized data to the display.

19. A system for monitoring a content delivery network, comprising:

means for obtaining data from devices within the network;

means for organizing the data into hierarchically accessible tiers; and means for displaying at least one of content distribution information, content resolution information, and streaming media information graphically mapped to the network in relation to geographic locations using at least part of the data at one of the hierarchically accessible tiers; wherein the hierarchically accessible tiers include a) a site tier including a map of geographic locations of those devices that are potential content sources in the network;

b) a service tier including a map of content-based relationships among the content sources; and c) an operations tier including a map of characteristics of the content sources and characteristics of relationships between the content sources and content in the network.

20. The system of claim 19, wherein:

the site tier map includes at least one of an origin site, a point of presence site, and a communication service provider;

the site tier map indicates locations of content sources within the network;

the service tier includes maps of content resolution, content distribution, and streaming media communication paths; and the operations tier includes configuration and launch information regarding content devices and content delivery applications within the network.

21. The system of claim 20, the operations tier comprising:

a table indicating content devices in the network table, and indicating for each device in the network a status of the device, a type of the device, a name of the device, a domain name server (DNS) name of the device, a list of customers connected to the device, a portal associated with the device, and a location of the device in the network.

22. The system of claim 20, the operations tier comprising:

a table indicating applications and/or application servers in the network, and indicating for each application and/or application server on the network a status, a type, a name, a host name, a report, and a location in the network, the report indicating statistical data about performance of the application and/or application server.

23. The system of claim 20, the operations tier comprising:

a table indicating protocols supporting the network, and indicating for each protocol, at least one of: a status, a type, a list of devices in the network using the protocol, statistical information about the protocol, and locations of devices in the network using the protocol.

24. The system of claim 19, comprising:

means for shifting a display among the hierarchically accessible tiers.

25. A machine readable medium comprising a computer program for causing a computer to:

obtain data from devices within a network;

organize the data into hierarchically accessible tiers; and display at least one of content distribution information, content resolution information, and streaming media information graphically mapped to the network in relation to geographic locations using at least part of the data at one of the hierarchically accessible tiers; wherein the hierarchically accessible tiers include a) a site tier including a map of geographic locations of those devices that are potential content sources in the network;

b) a service tier including a map of content-based relationships among the content sources; and c) an operations tier including a map of characteristics of the content sources and characteristics of relationships between the content sources and content in the network.

26. The medium of claim 25, wherein:

the site tier map includes at least one of an origin site, a point of presence site, and a communication service provider;

the site tier map indicates locations of content sources within the network;

the service tier includes maps of content resolution, content distribution, and streaming media communication paths; and the operations tier includes configuration and launch information regarding content devices and content delivery applications within the network.

27. The medium of claim 26, the operations tier comprising:

a table indicating content devices in the network table, and indicating for each device in the network a status of the device, a type of the device, a name of the device, a domain name server (DNS) name of the device, a list of customers connected to the device, a portal associated with the device, and a location of the device in the network.

28. The medium of claim 26, the operations tier comprising:

a table indicating applications and/or application servers in the network, and indicating for each application and/or application server on the network a status, a type, a name, a host name, a report, and a location in the network, the report indicating statistical data about performance of the application and/or application server.

29. The medium of claim 26, the operations tier comprising:

a table indicating protocols supporting the network, and indicating for each protocol, at least one of: a status, a type, a list of devices in the network using the protocol, statistical information about the protocol, and locations of devices in the network using the protocol.

30. The medium of claim 25, wherein the computer program causes the computer to:

shift a display among the hierarchically accessible tiers.

* * * * *